United States Patent
Choi

(10) Patent No.: US 10,855,968 B2
(45) Date of Patent: *Dec. 1, 2020

(54) METHOD AND APPARATUS FOR TRANSMITTING STEREOSCOPIC VIDEO CONTENT

(71) Applicant: Samsung Electronics Co., Ltd., Gyeonggi-do (KR)

(72) Inventor: Byeong-Doo Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/477,102

(22) PCT Filed: Dec. 14, 2017

(86) PCT No.: PCT/KR2017/014742
§ 371 (c)(1),
(2) Date: Jul. 10, 2019

(87) PCT Pub. No.: WO2018/131803
PCT Pub. Date: Jul. 19, 2018

(65) Prior Publication Data
US 2019/0356898 A1    Nov. 21, 2019

Related U.S. Application Data

(60) Provisional application No. 62/444,411, filed on Jan. 10, 2017.

(30) Foreign Application Priority Data

Dec. 13, 2017 (KR) ........................ 10-2017-0171492

(51) Int. Cl.
*H04N 13/178* (2018.01)
*H04N 13/194* (2018.01)
*H04N 13/161* (2018.01)

(52) U.S. Cl.
CPC ......... *H04N 13/178* (2018.05); *H04N 13/161* (2018.05); *H04N 13/194* (2018.05)

(58) Field of Classification Search
USPC .......................................... 348/38
See application file for complete search history.

(56) References Cited

U.S. PATENT DOCUMENTS

2013/0141547 A1 *   6/2013   Shimizu ............... G06T 3/0062
                                                            348/48
2014/0078249 A1    3/2014   Wang
(Continued)

OTHER PUBLICATIONS

MediaTek Inc., Joint Video Exploration Team (JVET) of ITU-T SG 16 WP 3 and ISO/IEC JTC 1/SC 29/WG11 Document JVET-D0142, 4th Meeting: Chengdu, CN, Oct. 16, 2016 . . . .
(Continued)

*Primary Examiner* — Behrooz M Senfi
(74) *Attorney, Agent, or Firm* — The Farrell Law Firm, P.C.

(57) ABSTRACT

A method for transmitting stereoscopic video content according to the present disclosure comprises the steps of: generating, on the basis of data of a stereoscopic video which includes a plurality of omnidirectional videos having parallax, a first frame comprising a plurality of first views projected from the plurality of omnidirectional videos; generating a second frame comprising a plurality of second views by packing, on the basis of region-wise packing information, a plurality of first regions included in the plurality of first views; and transmitting data on the generated second frame, wherein the plurality of second views include a plurality of second regions corresponding to the plurality of first regions, and the region-wise packing information includes information on shape, orientation, or transformation for each of the plurality of second regions.

15 Claims, 26 Drawing Sheets

(56) References Cited

U.S. PATENT DOCUMENTS

| | | | |
|---|---|---|---|
| 2014/0132598 A1 | 5/2014 | Narukawa | |
| 2016/0021354 A1 | 1/2016 | Lan | |
| 2016/0337670 A1 | 11/2016 | Suh et al. | |
| 2017/0244948 A1* | 8/2017 | Pang | H04N 5/2226 |
| 2018/0115706 A1* | 4/2018 | Kang | G06T 5/00 |
| 2019/0356898 A1* | 11/2019 | Choi | H04N 13/243 |
| 2020/0058165 A1* | 2/2020 | Choi | G06T 17/30 |

OTHER PUBLICATIONS

Lin, Hung-Chih et al., "AHG8: An efficient compact layout for octahedron format", pp. 7.

Systems, "WD on ISO/IEC 23000-20 Omnidirectional Media Application Format", ISO/IEC JTC1/SC29/WG11 N16439, Coding of Moving Pictures and Audio, Oct. 2016, 55 pages.

Nokia, "ISOBMFF Framework for Indicating Projection Format, Projection Orientation, Stereoscopic Packing, and Region-Wise Packing", 117 MPEG Meeting; ISO/IEC JTC1/SC29/WG11, Coding of Moving Pictures and Audio, Jan. 2017, 8 pages.

European Search Report dated Nov. 19, 2019 issued in counterpart application No. 17891098.0-1209, 7 pages.

PCT/ISA/210 Search Report issued on PCT/KR2017/014742, pp. 5.

PCT/ISA/237 Written Opinion issued on PCT/KR2017/014742, pp. 7.

* cited by examiner

METHOD AND APPARATUS FOR TRANSMITTING STEREOSCOPIC VIDEO CONTENT

PRIORITY

This application is a National Phase Entry of PCT International Application No. PCT/KR2017/014742 filed on Dec. 14, 2017, and claims priority to U.S. Provisional Patent Application No. 62/444,411 filed in the U.S. Patent and Trademark Office on Jan. 10, 2017, and Korean Patent Application No. 10-2017-0171492 filed in the Korean Intellectual Property Office on Dec. 13, 2017, the disclosure of each of which is incorporated herein by reference.

TECHNICAL FIELD

The disclosure relates to a method and an apparatus for packing data of a stereoscopic omnidirectional video.

BACKGROUND ART

The Internet has evolved from a human-centered connection network, in which humans create and consume information, into an Internet of Things (IoT) network, in which distributed components, such as objects, may exchange and process information. For example, in the Internet of Everything (IoE) technology, big-data processing technology is combined with the IoT through connection with a cloud server and the like.

As technological elements, such as sensing technology, wired/wireless communication and network infrastructure, service interface technology, security technology, and the like are required to implement IoT, technologies for sensor networks, machine-to-machine (M2M) communication, and machine-type communication (MTC) have been studied for establishing connections between objects.

In an IoT environment, an intelligent Internet technology (IT) service that collects and analyzes data generated from connected objects may be provided to create new value for human life. The IoT is applicable to the fields of smart homes, smart buildings, smart cities, smart cars or connected cars, smart grids, healthcare, smart home appliances, advanced medical care services, and the like through convergence and integration of existing IT technology with various industries. Meanwhile, content for implementing IoT is also evolving. That is, as black and white content continue to evolve into standardization and distribution of color content high definition (HD), ultrahigh definition television (UHD), and recent high dynamic range (HDR) content, research is underway on virtual reality (VR) content that can be played on VR devices such as Oculus and Samsung Gear VR. The VR system may essentially monitor a user and allow the user to provide feedback inputs into a content display device or processing unit using a predetermined controller, and the device or unit may process the inputs and adjust content accordingly to enable interaction.

The basic arrangements in a VR ecosystem include, for example, head mounted displays (HMDs), wireless and mobile VRs, televisions (TVs), cave automatic virtual environments (CAVEs), peripherals and haptics (other controllers to provide inputs to the VR), content capture (camera and video stitching), content studio (games, live event coverage, movies, news and documentaries), industrial applications (education, health care, real estate, construction, travel), production tools and services (3D engine, processing power), an App Store (for VR media content), and the like.

Without the implementation of the next generation post-high efficiency video coding (HEVC) codec, which can be specifically designed for 3D and 360 degree content, for capture, encoding, and transmission of 360 degree video content, which is performed to construct VR content, VR content creation and consumption face many challenges.

Therefore, there is a need for a scheme for more efficiently configuring and consuming VR content.

DETAILED DESCRIPTION OF THE INVENTION

Technical Problem

According to aspects of the disclosure, a method and an apparatus for packing data of a stereoscopic omnidirectional video are provided.

Also, according to aspects of the disclosure, a trapezoid-based region-wise packing method is provided.

Additionally, according to aspects of the disclosure, a method for packing an omnidirectional fisheye video is provided.

Technical Solution

In accordance with an aspect of the disclosure, a method for packing stereoscopic video content includes: projecting, on the basis of data of a stereoscopic video which includes a plurality of omnidirectional videos having parallax, a first frame including a plurality of first views corresponding to the plurality of omnidirectional videos; signaling region-wise packing information; sampling, on the basis of the region-wise packing information, a plurality of second regions included in a plurality of second views from a plurality of first regions included in the plurality of first views; and packing, on the basis of the region-wise packing information, a second frame including the plurality of second views, wherein each of the plurality of first views includes a 360 degree video or a part of the 360 degree video.

In accordance with another aspect of the disclosure, a method for transmitting stereoscopic video content includes: generating, on the basis of data of a stereoscopic video which includes a plurality of omnidirectional videos having parallax, a first frame including a plurality of first views projected from the plurality of omnidirectional videos; generating a second frame including a plurality of second views by packing, on the basis of region-wise packing information, a plurality of first regions included in the plurality of first views; and transmitting data on the generated second frame, wherein the plurality of second views include a plurality of second regions corresponding to the plurality of first regions, and the region-wise packing information includes information on shape, orientation, or transformation for each of the plurality of second regions.

In accordance with another aspect of the disclosure, an apparatus for transmitting stereoscopic video content includes: a memory; a transceiver; and at least one processor configured to be connected to the memory and the transceiver, wherein the at least one processor is configured to generate, on the basis of data of a stereoscopic video which includes a plurality of omnidirectional videos having parallax, a first frame including a plurality of first views projected from the plurality of omnidirectional videos, to generate a second frame including a plurality of second views by packing, on the basis of region-wise packing information, a plurality of first regions included in the plurality of first views, and to transmit data on the generated second frame, the plurality of second views include a plurality of second regions corresponding to the plurality of first regions, and the region-wise packing information includes information on shape, orientation, or transformation for each of the plurality of second regions.

MODE FOR CARRYING OUT THE INVENTION

Figure 1:
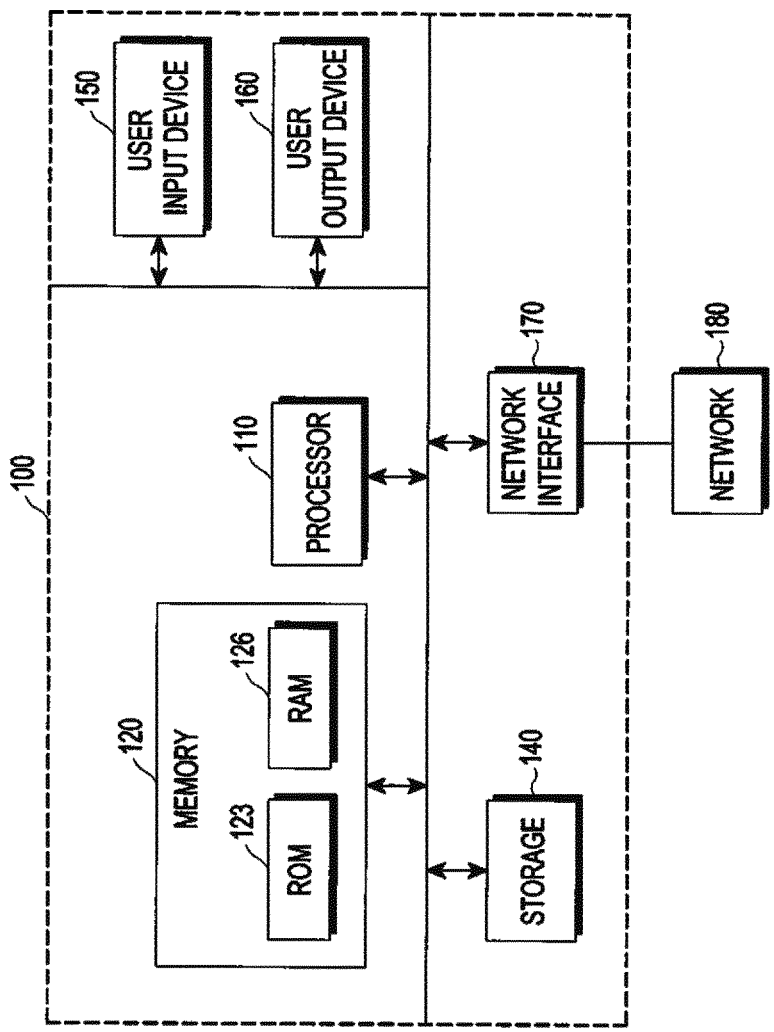
FIG. 1 is an exemplary diagram illustrating a configuration of a computer system in which a method for packing a stereo omnidirectional video according to the disclosure is implemented.

Hereinafter, operation principles of exemplary embodiments of the disclosure will be described in detail with reference to accompanying drawings. Like reference numerals designate like components in the drawings where possible even though components are shown in different drawings. In the following description of the disclosure, a detailed description of related known functions or configurations will be omitted so as not to obscure the subject of the disclosure. The terms as described below are defined in consideration of the functions in the embodiments, and the meaning of the terms may vary according to the intention of a user or operator, convention, or the like. Therefore, the definitions of the terms should be made based on the contents throughout the specification.

The disclosure may have various modifications and various embodiments, among which specific embodiments will now be described more fully with reference to the accompanying drawings. However, it should be understood that there is no intent to limit the disclosure to the particular forms disclosed, but on the contrary, the disclosure is to cover all modifications, equivalents, and alternatives falling within the spirit and scope of the disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the constituent elements are not limited by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

The terms used herein are used only to describe particular embodiments, and are not intended to limit the disclosure. As used herein, the singular forms are intended to include the plural forms as well, unless the context clearly indicates otherwise. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the disclosure.

According to various embodiments of the disclosure, an electronic device may include a communication functionality. The terminal may, for example, be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, or a wearable device (e.g., Head-Mounted Device (HMD), electronic clothes, an electronic bracelet, an electronic necklace, an electronic appcessory, an electronic tattoo, or a smart watch).

According to various embodiments of the disclosure, the electronic device may be a smart home appliance with a communication functionality. The smart home appliance may, for example, be a television, a Digital Video Disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the disclosure, the terminal may be a medical appliance (e.g., Magnetic Resonance Angiography (MRA) device, Magnetic Resonance Imaging (MRI) device, Computed Tomography (CT) device, and ultrasonic device), a navigation device, a Global Positioning System (GPS) receiver, an Event Data Recorder (EDR), a Flight Data Recorder (FDR), an automotive infotainment device, a marine electronic device (e.g., ship navigation device and a gyrocompass), avionics, security equipment, or an industrial or home robot.

According to various embodiments of the disclosure, the electronic device may be a part of a piece of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the disclosure, the electronic device may be a combination of the above-mentioned devices. Further, it will be apparent to those skilled in the art that the terminal according to various embodiments of the disclosure is not limited to the above-mentioned devices.

According to various embodiments of the disclosure, a device for transmitting and receiving VR content may be, for example, an electronic device.

Hereinafter, terms used in the embodiments of the disclosure are defined as follows. An image may be a video, a still image, or the like, and image content may include a video, a still image, and a variety of multimedia content including the related audio, subtitles, and the like. VR content includes image content providing the image as a 360-degree video, a 3D image, or the like. A media file format may be a media file format conforming to various media-related standards such as international organization for standardization (ISO)-based media file format (ISOB-MFF). Projection refers to a process in which a spherical image for a 360-degree video or the like is projected on a planar surface or an image frame according to a result of the process. Mapping refers to a process in which image data on a planar surface according to the projection is mapped to a 2D planar surface or an image frame according to a result of the process. Omnidirectional media may include, for example, an image or video that can be rendered according to the direction of head movement or viewport of a user when the user uses a Head Mounted Display (HMD), and/or the related audio. The viewpoint may be referred to as a Field Of View (FOV), and may refer to a region of an image to be viewed by a user at a specific time point (the region of the image may be a region of the spherical image, etc.).

Hereinafter, preferred embodiments of the disclosure will be described in detail with reference to the accompanying drawings.

FIG. 1 is an exemplary diagram illustrating a configuration of a computer system in which a method for packing a stereo omnidirectional video according to the disclosure is implemented.

Meanwhile, the method for packing a stereo omnidirectional video according to an embodiment of the disclosure may be implemented in a computer system or recorded in a recording medium. As shown in FIG. 1, the computer system may include at least one processor 110 and a memory 120.

The processor 110 may be a central processing unit (CPU) or a semiconductor device that processes instructions stored in the memory 120.

The processor 110 may be a controller that controls all operations of the computer system 100. The controller can execute operations performed by the computer system 100 by reading and executing program codes stored in the memory 120.

The computer system 100 may include a user input device 150, a data communication bus 130, a user output device 160, and a storage 140. Each of the above-described components can perform data communication via the data communication bus 130.

The computer system may further include a network interface 170 connected to a network 180.

The memory 120 and the storage 140 may include various types of volatile or non-volatile storage media. For example, the memory 120 may include a ROM 123 and a RAM 126. The storage 140 may include a non-volatile memory such as a magnetic tape, a hard disk drive (HDD), a solid state drive (SSD), an optical data device, and a flash memory.

Accordingly, the method for packing a stereo omnidirectional video according to the embodiment of the disclosure can be implemented in a computer-executable method. When the method for packing a stereo omnidirectional video according to the embodiment of the disclosure is performed in a computer device, computer-readable instructions can perform an operating method according to the disclosure.

Meanwhile, the method for packing a stereo omnidirectional video according to the disclosure described above can be implemented as a computer-readable code on a computer-readable recording medium. The computer-readable recording medium includes all types of recording media in which data readable by a computer system is stored. Examples of the recording medium are a read only memory (ROM), a random access memory (RAM), a magnetic tape, a magnetic disk, a flash memory, an optical data storage device and the like. Also, the computer-readable recording medium may be distributed in computer systems connected through a computer communication network and stored and executed as a code that can be read in a distributed manner.

In the disclosure, a region-wise packing method for a stereoscopic 360-degree video is proposed.

In addition, a generalized region-wise packing method using a plurality of patches is proposed. Many researchers and practitioners are studying various layouts for each projection. It has been found that the coding efficiency can be significantly improved depending on the type of layout. Each region indicated by a particular patch can be resampled and relocated from a projected frame to a packed frame. Thus, the patch specifies the region of video data to be packed.

Three parameters are proposed corresponding to various aspects of three-dimensional geometries (e.g., hexahedrons, octahedrons, icosahedrons, etc.) in order to allow regions that can be specified by various polyhedrons. The three parameters are patch_shape, patch_orientation, and patch_transform. patch_shape denotes the shape of the patch, i.e., a rectangle, an isosceles triangle, a right triangle, and so on. Here, the patch may refer to each region included in each view of the packed frame, or may refer to each region included in each view of the projected frame. patch_orientation denotes the rotation and flip (symmetry of the left and right mirrors) of the patch shape indicating the orientation of various shapes. patch_transform denotes the rotation and flip of image data specified by the patch. In addition, a trapezoid-based region-wise packing method is proposed.

At an international conference on the omnidirectional media application format (OMAF), a monoscopic/stereoscopic representation is negotiated. Many VR players and service platforms can play and transmit stereoscopic 360-degree videos. Depending on the stereoscopic format, left/right stereoscopic 360-degree video and top/bottom stereoscopic 360-degree video can be supported.

Figure 2:
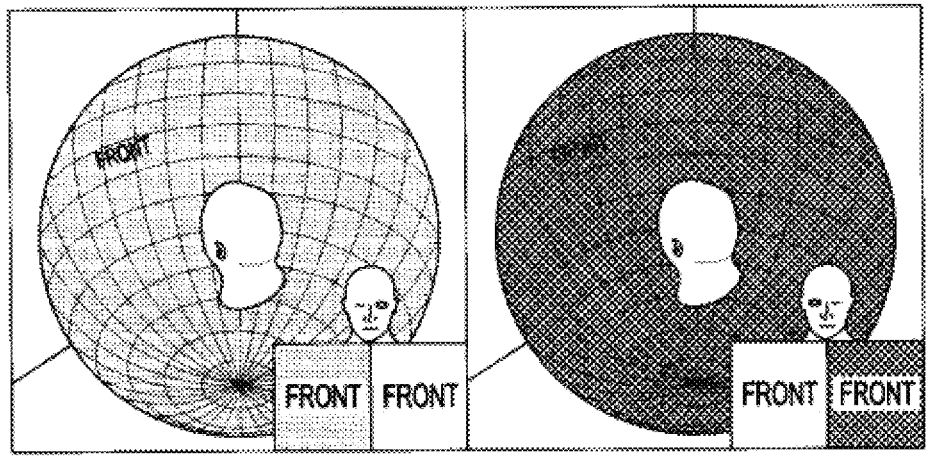
FIG. 2 illustrates a left/right stereoscopic 360 format according to the disclosure.
Figure 3:
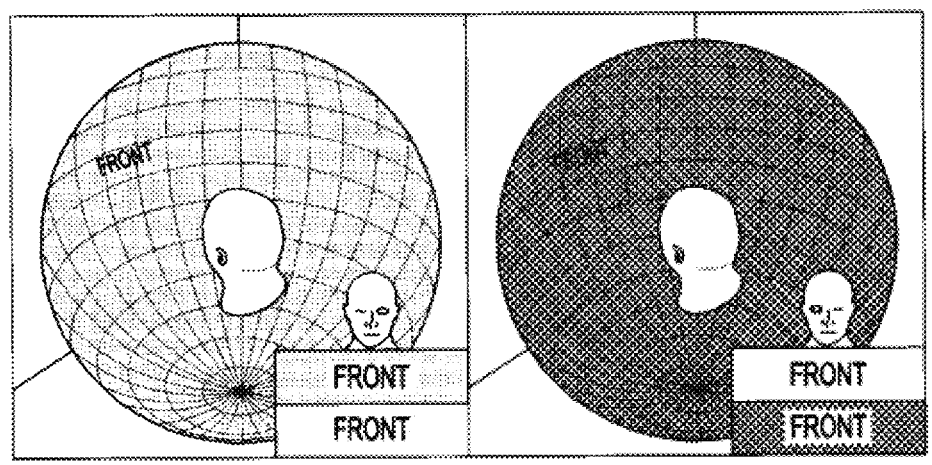
FIG. 3 illustrates a top/bottom stereoscopic 360 format.

FIG. 2 illustrates a left/right stereoscopic 360 format according to the disclosure, and FIG. 3 illustrates a top/bottom stereoscopic 360 format.

Figure 4:
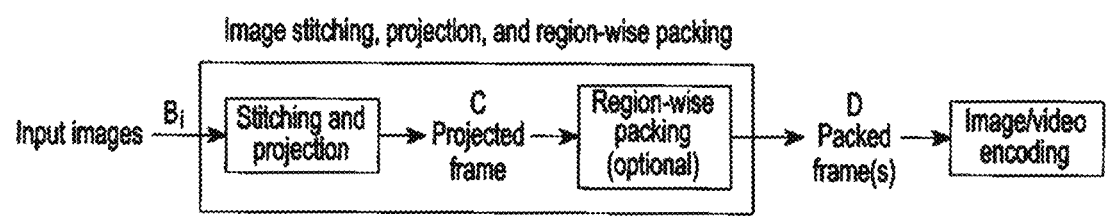
FIG. 4 illustrates image stitching, projection, and region-wise packing of a single acquisition time instance.

FIG. 4 illustrates image stitching, projection, and region-wise packing of a single acquisition time instance.

A region-wise packing method according to the disclosure is proposed. The region-wise packing method can flexibly subdivide a projected frame into a plurality of regions. Each region can be resized and relocated into a packed frame.

Hereinafter, a region-wise packing method for both a monoscopic 360-degree video and a stereoscopic 360-degree video will be described.

In the case of monoscopic 360 degree video, input images of a single time instance are stitched to generate a projected frame representing one view. In the case of stereoscopic 360-degree video, input images of a single time instance are stitched to generate a projected frame representing two views (one for each eye). Both views are mapped to the same packed frame and encoded by a conventional two-dimensional (2D) video encoder.

Optionally, each view of the projected frame may be mapped to a packed frame. The sequence of the packed frame of a left or right view can be independently coded and predicted from another view when a multi-view video encoder is used.

Although the stereo 360-degree video format and the region-wise packing method thereof have been agreed upon, certain parameters defining the layout of the stereo 360-degree video format have not yet been proposed or adopted. In the disclosure, some types of layout definitions of stereoscopic 360-degree video in a packed frame are proposed. Here, each type has its own advantages. For example, a mixed and independent packing method of a left view and a right view may provide excellent performance in terms of coding efficiency, but in a tile-based transmission for viewport dependent streaming, it is suitable to pack the left view and the right view in pairs. The syntax and semantics for region-wise packing are described below, Referring to FIG. 4, images $B_i$ of the concurrent instance are stitched, projected and mapped to a packed frame D. FIG. 4 is a schematic diagram illustrating image stitching, projection, and region-wise packing process. The input images B are stitched and projected onto a 3D projection structure such as a sphere or a cube. Image data on the projection structure is further arranged on a 2D projection frame C. The format of the 2D projection frame is indicated by a projection format indicator defined in coding independent media description code points (CICP) or an omnidirectional media application format (OMAF).

Optional region-wise packing is applied to map the 2D projection frame C to one or more packed frames D. If the region-wise packing is not applied, the packed frame will be the same as the projected frame. Otherwise, regions of the projected frame are mapped to the one or more packed frames D by indicating the position, shape, and size of each region of the one or more packed frames D. Practically, input images are transformed into the packed frame by one process without any intermediate process.

Hereinafter, various layouts for stereoscopic 360-degree video packing will be described.

In the stereoscopic 360-degree video packing, both left and right views can be packed in the same packed frame. Then, when the stereoscopic formats of the left and right views are the same, each view of a native layout can be located in the left or right region. If region-wise packing is applied to each view or both views, various layouts are possible in each embodiment. In order to define each type of the stereoscopic layouts, two parameters are employed. The two parameters are stereo_format and stereo_packing_type, stereo_format parameter is an indicator that specifies a stereoscopic format such as side-by-side or top-bottom.

stereo_packing_type defines a layout type for stereoscopic region-wise packing. The layout type relates to whether the positions of the respective regions belonging to the left view or the right view are separated, mixed, independent, or corresponded to each other.

Each stereo_packing_type has advantages in terms of coding efficiency and functionality. In the following figures, it is assumed that the left/right stereoscopic 360 format is the same.

Figure 5:
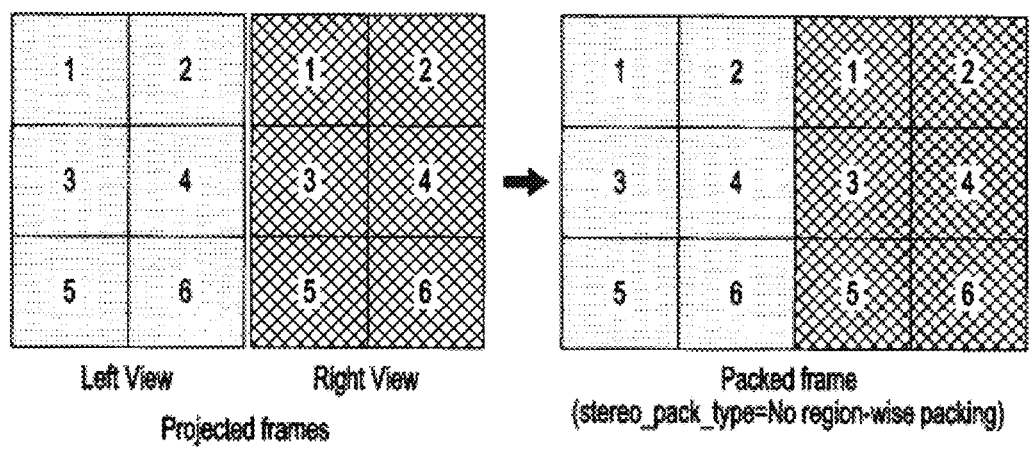
FIG. 5 is an exemplary diagram illustrating non-region-wise packing according to the disclosure.

FIG. 5 is an exemplary diagram illustrating a non-region-wise packing method according to the disclosure.

No Region-Wise Packing

Non-region-wise packing using a native layout instead of region-wise packing is possible.

If stereo_packing_type corresponds to non-region-wise packing, each projected frame using the native layout is located in the left and right regions without shuffling. The packing method using the native layout is the simplest layout and is an efficient way to quickly extract and render each view. Since the projected frame and the packed frame are the same, the data structure of image data is not changed.

Figure 6:
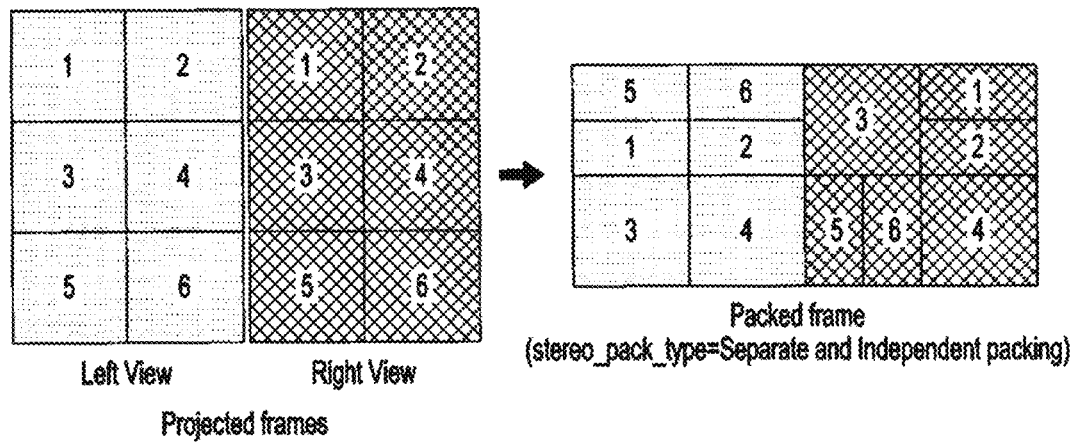
FIG. 6 is an exemplary diagram illustrating separate and independent packing according to the disclosure.

FIG. 6 is an exemplary diagram illustrating a separate and independent packing method according to the disclosure.

Separate and Independent Packing

If stereo_packing_type corresponds to separate and independent packing, each projected frame with the basic layout of the projection can be located in the left/right region.

Then, each half-frame corresponding to each view is internally recognized by region-wise packing. Each view is separate, but local regions included in each view are resampled and located in a half-packed frame corresponding to the same view. A separate and independent packing layout is effective for fast extraction and coding efficiency improvement. However, each view must be recognized for rendering after being decoded.

Figure 7:
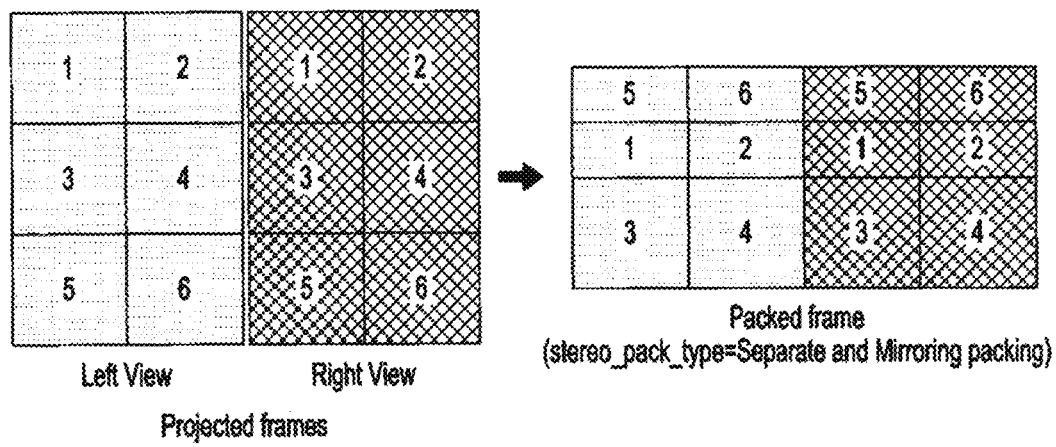
FIG. 7 is an exemplary diagram illustrating separate and mirroring packing according to the disclosure.

FIG. 7 is an exemplary diagram illustrating a separate and mirroring packing method according to the disclosure.

Separate and Mirroring Packing

If stereo_packing_type corresponds to separate and mirroring packing, each projected frame with the basic layout of the projection can be located in the left/right region.

Then, each half-frame corresponding to each view is internally recognized by region-wise packing. Thus, each view is separate, but local regions included in each view are resampled and located in a half-packed frame corresponding to the same view. A difference from the separate and independent packing is that the region-wise packing method of one view is identical to the region-wise packing method of another view. Compared to the separate and independent packing, it is possible to save bits. Since the region-wise packing parameter of one view is identical to the region-wise packing parameter of another view, the region-wise packing parameter of one view does not need to be signaled.

Figure 8:
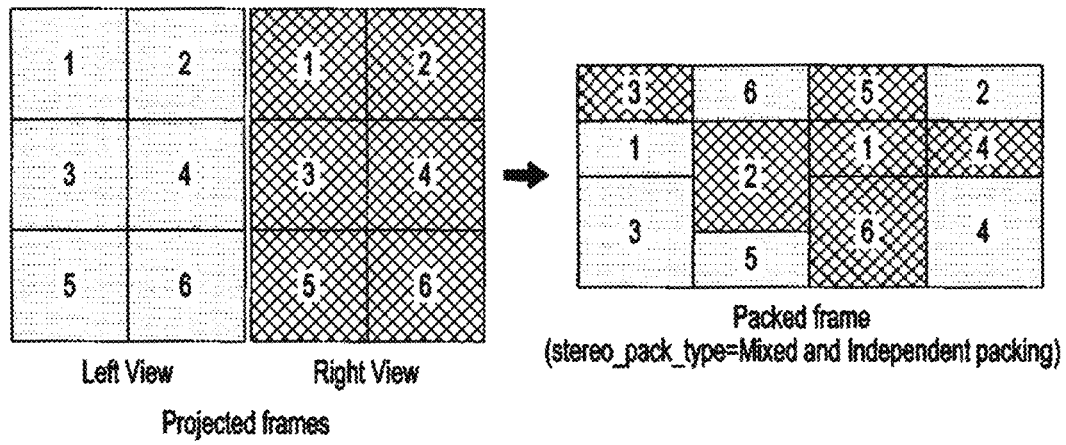
FIG. 8 is an exemplary diagram illustrating mixed and independent packing according to the disclosure.

FIG. 8 is an exemplary diagram illustrating mixed and independent packing method according to the disclosure.

Mixed and Independent Packing

If stereo_packing_type corresponds to mixed and independent packing, each region of the projected frame of one view is resampled and disposed at a specific location in the packed frame. There is no limitation to recognize the left and right frames projected on the same packed frame. An advantage of the mixed and independent packing is coding efficiency. According to the mixed and independent packing, an optimal layout with full flexibility in terms of compression can be found. However, extracting a view from the packed frame is complex, and the view has to be recognized for rendering.

Figure 9:
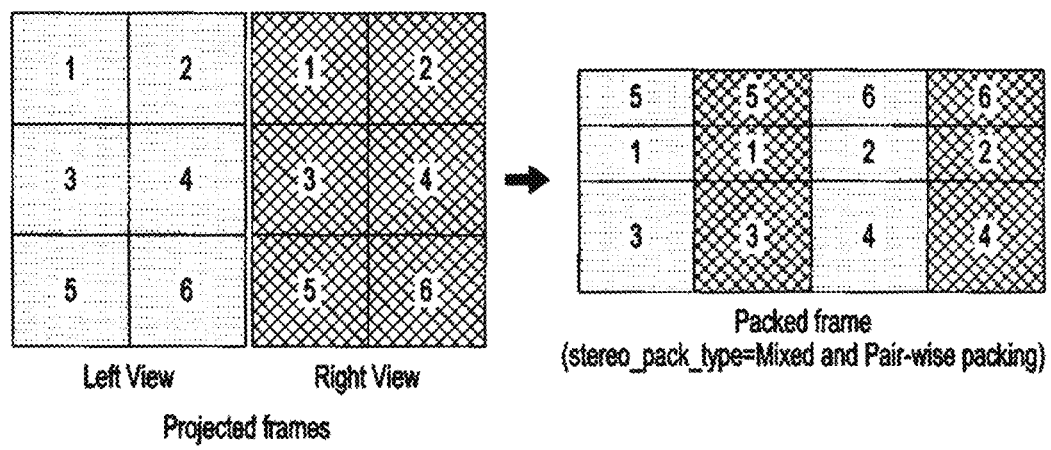
FIG. 9 is an exemplary diagram illustrating mixed and pair-wise packing according to the disclosure.

FIG. 9 is an exemplary diagram illustrating mixed and pair-wise packing according to the disclosure.

Mixed and Pair-Wise Packing

If stereo_packing_type corresponds to mixed and pair-wise packing, each region of the projected frame of the left view is resampled and disposed at a specific location in the packed frame. Then, the corresponding region (same position, same size) of the projected frame of the right view is sampled in the same manner as in the left view and is located to the right of the projected region of the left view (when top/bottom stereoscopic is used, the right view region may be located in the bottom portion of the packed region of the left view). The main advantage of the mixed and pair-wise packing is that both the left region and the right region are located in the projected frame in a pair-wise manner. Thus, it is suitable for tile-based transmission and rendering. A region packed in a pair-wise manner may be a tile. When specific tiles dependent on the current viewport are transmitted, the stereoscopic views can always be displayed because each tile includes a left view and a right view. Bits representing region-wise packing parameters for the right view can be conserved as well.

Figure 10:
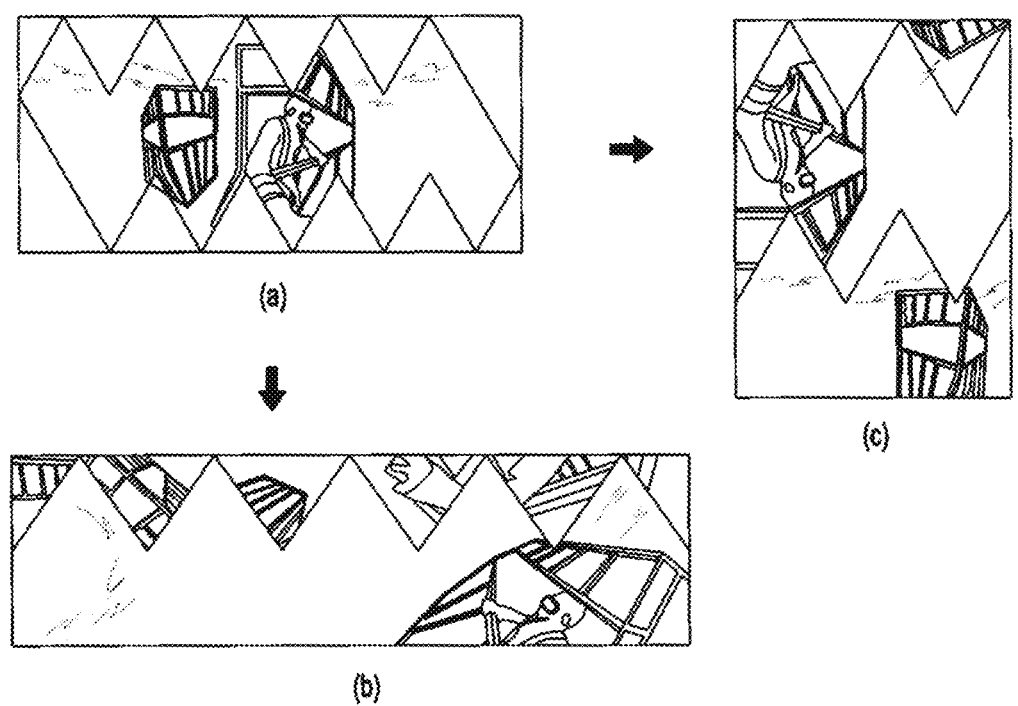
FIGS. 10A to 10C are exemplary diagrams illustrating a packing method for a regular polygonal projection image according to the disclosure.

FIGS. 10A to 10C are exemplary diagrams illustrating a packing method for a regular polygonal projection image according to the disclosure There is no limitation to recognize the left and right frames projected on the same packed frame. An advantage of the mixed and independent packing is coding efficiency. According to the mixed and independent packing, an optimal layout with full flexibility in terms of compression can be found. However, extracting a view from the packed frame is complex, and the view has to be recognized for rendering.

In the disclosure, a plurality of layouts of each projection will be proposed in order to find the most excellent layout, in terms of coding efficiency and memory usage. By observing that the packed projection is performed better, several methods for packing to eliminate unnecessary projection redundancy can be compared to a native unfolding or unrolling method.

For icosahedron-based projection (ISP), it was reported that a difference in compression efficiency between a native layout and a compact projection layout to be packed was 9.5% (all intra, AI), 4.9% (random access, RA), 3.0% (low delay B picture, LD-B), or 3.3% (low delay P picture, LD-P). Experimental results of cube-based projection (CMP) show that a 4×3 native layout surpassed a 3×2 compact layout by 1.4% (AI), 1.3% (RA), 1.7% (low delay B picture, LD-B), or 1.7% (low delay P picture, LD-P) on average in terms of coding efficiency. No significant RD gain was found. Based on these results, triangle-based packing for ISP is expected to be more efficient than rectangle-based packing for CMP.

Figure 11:
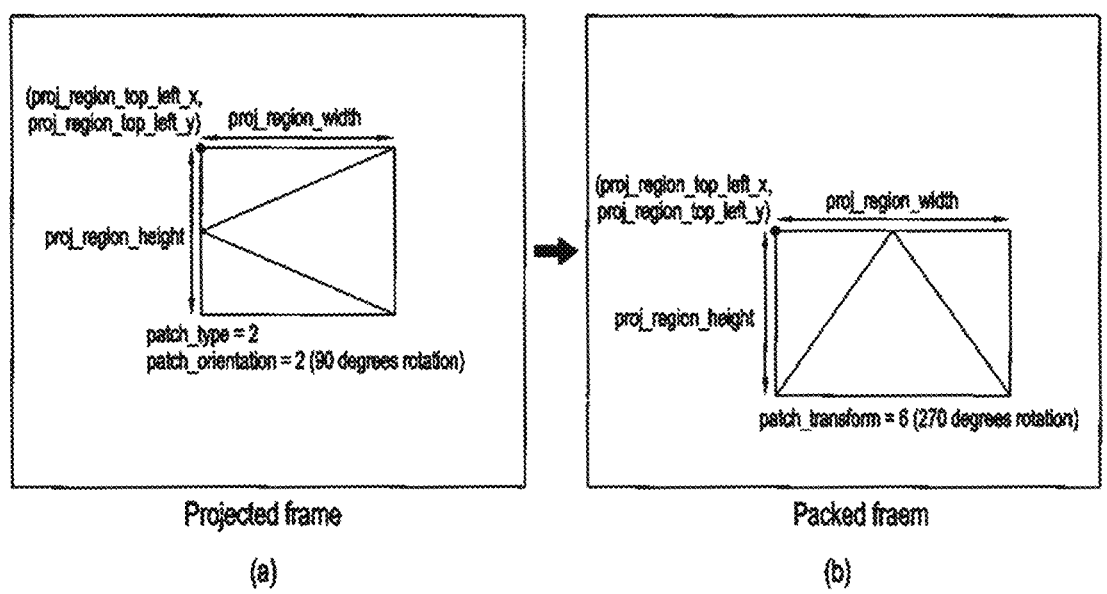
FIGS. 11A and 11B are exemplary diagrams illustrating a region-wise packing method using a triangular patch according to the disclosure.
Figure 12:
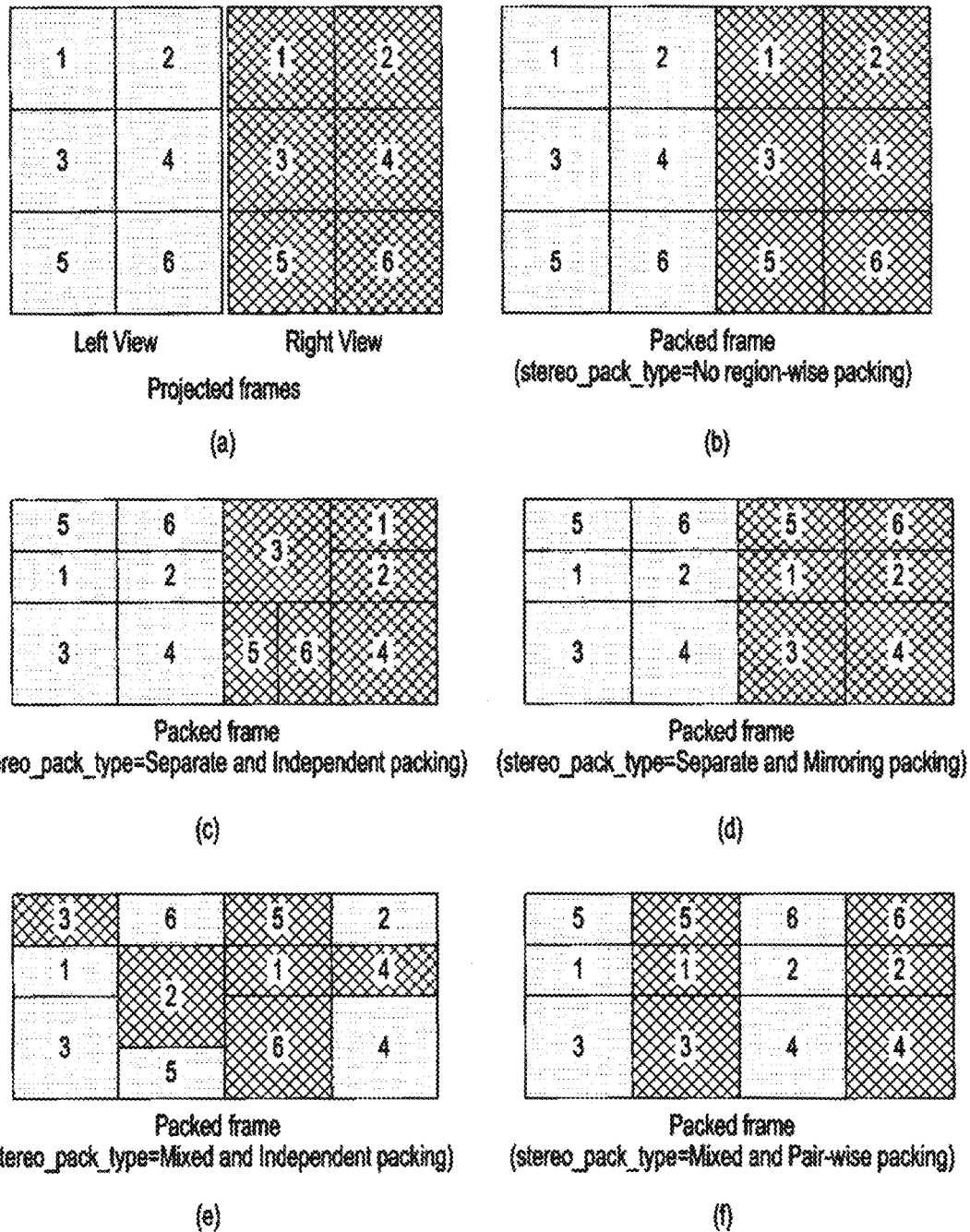
FIGS. 12A to 12F are exemplary diagrams illustrating the layout of left and right regions used in a non-region-wise packing method according to the disclosure.
Figure 13:
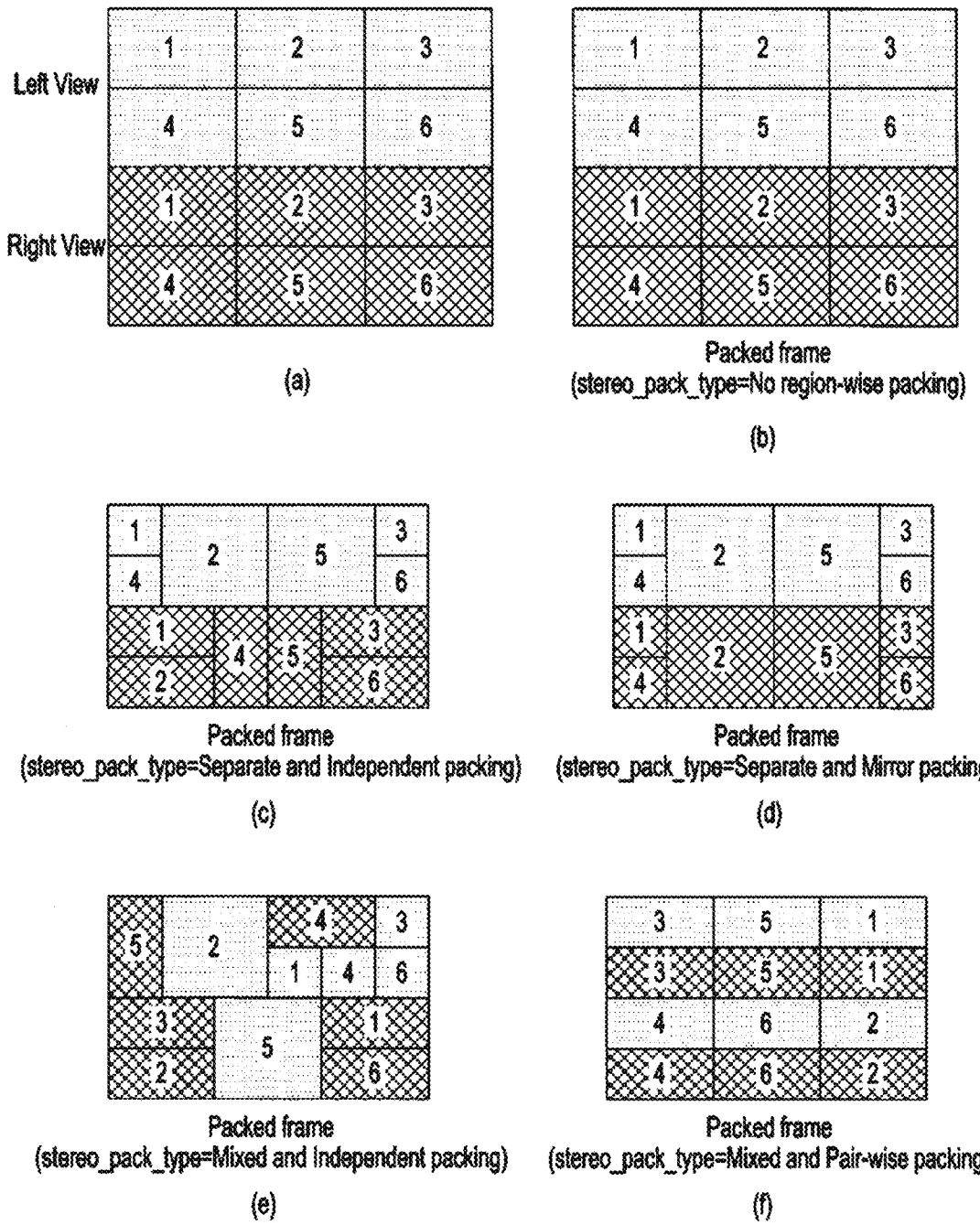
FIGS. 13A to 13F are exemplary diagrams illustrating the layout of upper and lower regions used in a non-region-wise packing method according to the disclosure.

FIGS. 11A and 11B are exemplary diagrams illustrating a region-wise packing method using a triangular patch according to the disclosure.

General Region-Wise Packing

To determine what kind of packing method is needed, the disclosure should pre-determine which projection method of OMAF was adopted. However, the disclosure proposes a generalized region-wise packing method that uses multiple patches to enable a triangle-based packing method within the range of pack verification experiments (PACK-VEs). In some projection methods, it is assumed that a rectangular regular polyhedron (cube) and a triangular regular polyhedron (octahedron, regular hexahedron, or the like) can be used in OMAF with a possible native projection method or an optional projection method by a uniform resource indicator (URI) or other extended mechanisms. Here, it is preferable to use generalized packing that can improve coding efficiency with cube based projection (CMP), octahedron based projection (OHP), icosahedron based projection (ISP), segmented sphere projection (SSP), and truncated square pyramid (TSP).

In the region-wise packing method proposed in the disclosure, each region indicated by a particular patch can be resampled and relocated from a projected frame to a packed frame. Thus, the patch is shaped to specify image data to be packed. Three parameters (patch_shape, patch_orientation, and patch_transform) are proposed so that regions corresponding to various aspects of various 3D geometries (e.g., cube, octahedron, regular hexahedron, etc.) can be specified by various regular polyhedra. patch_shape denotes the shape of the patch (rectangle, equilateral triangle, right-angled triangle, or the like), patch_orientation denotes the rotation and flip of the patch shape indicating the orientations of various shapes, and patch_transform denotes the rotation and flip of image data specified by the patch.

FIG. 11A is an exemplary diagram illustrating parameters of a triangular patch of a projected frame, and shows top-left coordinates (proj_region_top_left_x, proj_region_top_left_y) of a region included in the projected frame, a width (proj_region_width), a height (proj_region_height), a patch type (patch_type, patch_shape), and a patch orientation (patch_orientation). If the patch type is 2, it means that the patch shape is an equilateral triangle. If the patch orientation is 2, it means that the region of the projected frame is generated by rotating the region of an input image by 90 degrees in the counterclockwise direction.

FIG. 11B is an exemplary diagram illustrating parameters of a triangular patch of a packed frame, and shows top-left coordinates (pack_region_top_left_x, pack_region_top_left_y) of a region included in the packed frame, a width (pack_region_width), a height (pack_region_height), and patch transform (patch_transform). If the patch type is 2, it means that the shape of the patch is an equilateral triangle. If the patch transform is 6, it means that the region of the packed frame is generated by rotating the region of the projected frame by 270 degrees in the counterclockwise direction.

5. Syntax

Table 1 is a syntax showing a data structure used to perform the stereoscopic region-wise packing method according to the disclosure.

TABLE 1

```
aligned(8) class SterescopicRegionWisePacking {
    unsigned int(8) stereo_format;
    unsigned int(8) stereo_packing_type;
    unsigned int(32) width_proj_frame;
    unsigned int(32) height_proj_frame;
    unsigned int(8) num_of_regions;
    unsigned int(1) uniform_region_size;
    unsigned int(7) reserved = 0;
    if (uniform_size_region == 1) {
        unsigned int(32) uniform_region_width;
        unsigned int(32) uniform_region_height;
    }
    for (i=0; i<num_of_regions; i++){
        if (uniform_region_size == 0) {
            unsigned int(32) proj_region_width[i];
            unsigned int(32) proj_region_height[i];
        }
        unsigned int(32) proj_region_top_left_x[i];
        unsigned int(32) proj_region_top_left_y[i];
        unsigned int(8) patch_shape[i];
        unsigned int(8) patch_orientation[i];
        unsigned int(8) patch_transform [i];
        unsigned int(8) reserved = 0;
        unsigned int(32) pack_region_width[i];
        unsigned int(32) pack_region_height[i];
```

TABLE 1-continued

```
        unsigned int(32) pack_region_top_left_x[i];
        unsigned int(32) pack_region_top_left_y[i];
    }
}
```

6. Semantics

Table 2 shows a setting value of stereo_format that specifies a stereoscopic 360-degree video format.

TABLE 2

| Value | stereo_format |
| --- | --- |
| 0x00 | Reserved |
| 0x01 | Left/right stereoscopic 360 format |
| 0x02 | Top/bottom stereoscopic 360 format |
| 0x03-0xFF | Reserved |

Table 3 shows a setting value of stereo_packing_type that specifies a region-wise packing type for a stereoscopic 360-degree video.

TABLE 3

| Value | stereo_packing_type |
| --- | --- |
| 0x00 | reserved |
| 0x01 | no region-wise packing (native) |
| 0x02 | separate and independent packing |
| 0x03 | separate and mirroring packing |
| 0x04 | mixed and independent packing |
| 0x05 | mixed and mirroring packing |
| 0x06-0xFF | Reserved |

If stereo_packing_type is 1, it specifies a projected frame having a native layout of projection located in the left and right regions (or upper and lower regions) without shuffling.

If stereo_packing_type is 2, each projected frame having a native layout is located in the left or right region. Then, each half-frame corresponding to each view is internally recognized by region-wise packing. Each view is separate, but local regions included in each view are resampled and located in a half-packed frame corresponding to the same view. A separate-independent packing layout is effective for fast extraction and coding efficiency improvement. However, each view has to be decoded and then recognized for rendering.

If stereo_packing_type is 3, each projected frame having the native layout of projection may be located in the left/right region. Then, each half-frame corresponding to each view is internally recognized by region-wise packing. Thus, each view is separate, but local regions included in each view are resampled and located in a half-packed frame corresponding to the same view. A difference from the separate and independent packing is that the region-wise packing method of one view is identical to the region-wise packing method of another view.

If stereo_packing_type is 4, each region of the projected frame of one view is resampled and disposed at a specific location in the packed frame. There is no limitation to recognize the left and right frames projected on the same packed frame.

If stereo_packing_type is 5, each region of the projected frame of the left view is resampled and disposed at a specific location in the packed frame. Then, the corresponding region (same position, same size) of the projected frame of the right view is sampled in the same manner as in the left view and is located to the right of the projected region of the left view (when top/bottom stereoscopic is used, the right view region may be located in the bottom portion of the packed region of the left view).

FIGS. 12A to 12F are exemplary diagrams illustrating the layout of left and right regions used in a non-region-wise packing method according to the disclosure, and shows projected frames and the layout of the left and right regions of the packed frame when stereo_packing_type is no region-wise packing (native), separate and independent packing, separate and mirroring packing, mixed and independent packing, or mixed and mirroring packing.

FIGS. 13A to 13F are exemplary diagrams illustrating the layout of upper and lower regions used in a non-region-wise packing method according to the disclosure, and shows projected frames and the layout of the upper and lower regions of the packed frame when stereo_packing_type is no region-wise packing (native)(0x01), separate and independent packing (0x02), separate and mirroring packing (0x03), mixed and independent packing (0x04), or mixed and mirroring packing (0x05).

width_proj_frame denotes the width of the projected frame.

height_proj_frame denotes the height of the projected frame.

num_of_regions denotes the number of packed regions specified by a patch.

If uniform_region_size is 1, it indicates that the projected frame is divided into regions having the same size specified by uniform_region_width and uniform_region_height. If uniform_region_size is 0, it indicates that an i-th region (i is an integer from 0 to num_of_regions−1) of the projected frame is specified by the size specified by proj_region_width [i] and proj_region_hieight[i].

uniform_region_width and uniform_region_height specify each region of the projected frame with the same size width and height.

proj_region_width[i] and proj_region_height[i] specify the i-th region of the projected frame.

patch_shape[i] specifies the shape of the i-th region to be relocated to the packed frame.

Table 4 shows the shape of each region of the projected frame according to patch_shape.

TABLE 4

| Value | patch_shape |
|---|---|
| 0x00 | reserved |
| 0x01 | rectangle |
| 0x02 | equilateral triangle |
| 0x03 | right-angled triangle |
| 0x04-0xFF | reserved |

Figure 14A:
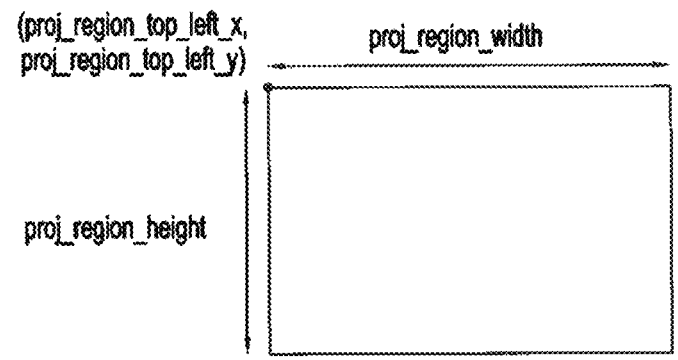
FIGS. 14A to 14C illustrate the shapes of patches according to patch_shape of the disclosure.
Figure 14B:
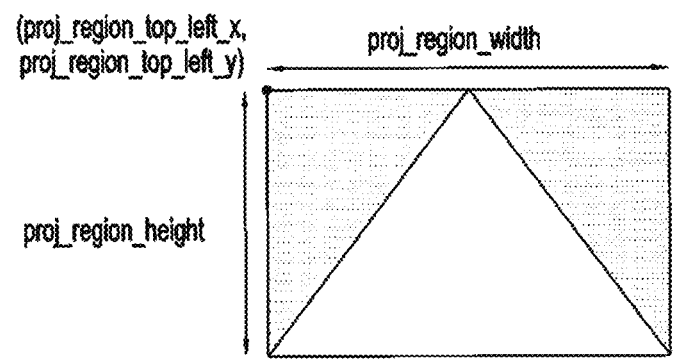
Figure 14C:
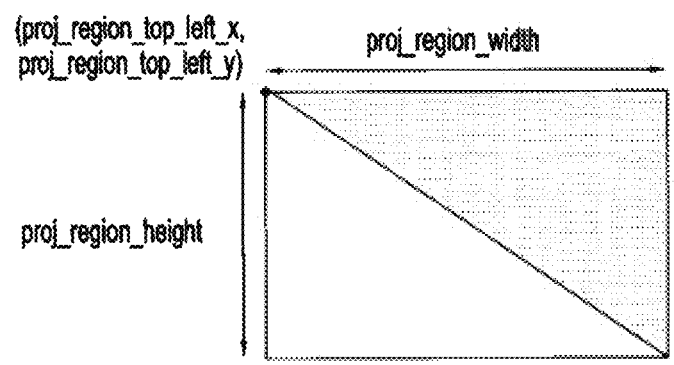

FIGS. 14A to 14C illustrate the shapes of patches according to patch_shape of the disclosure.

FIG. 14A shows that patch_shape is 0x01 (rectangle), FIG. 14B shows that patch_shape is 0x02 (equilateral triangle), and FIG. 14C shows that patch_shape is 0x03 (right-angled triangle).

patch_orientation[i] specifies the shape of a patch that is rotated and flipped from an original patch shape (i-th region of the projected frame) indicated by patch_shape[i].

Table 5 shows semantics of rotation or flip according to patch_orientation[i].

TABLE 5

| values | semantics |
|---|---|
| 0x00 | reserved |
| 0x01 | no rotation or flip |
| 0x02 | 90 degrees rotation (counter-clockwise) |
| 0x03 | 90 degrees rotation (counter-clockwise) after horizontal flip |
| 0x04 | 180 degrees rotation (counter-clockwise) |
| 0x05 | 180 degrees rotation (counter-clockwise) after horizontal flip |
| 0x06 | 270 degrees rotation (counter-clockwise) |
| 0x07 | 270 degrees rotation (counter-clockwise) after horizontal flip |
| 0x08-0xFF | reserved | patch_transform[i] specifies rotation and flip of image data specified by patch_orientation[i] and patch_shape[i] to be relocated to the packed frame.

Table 6 shows semantics of rotation or flip according to patch_transform[i].

TABLE 6

| Values | semantics |
|---|---|
| 0x00 | reserved |
| 0x01 | no rotation or flip |
| 0x02 | 90 degrees rotation (counter-clockwise) |
| 0x03 | 90 degrees rotation (counter-clockwise) after horizontal flip |
| 0x04 | 180 degrees rotation (counter-clockwise) |
| 0x05 | 180 degrees rotation (counter-clockwise) after horizontal flip |
| 0x06 | 270 degrees rotation (counter-clockwise) |
| 0x07 | 270 degrees rotation (counter-clockwise) after horizontal flip |
| 0x08-0xFF | reserved | packed_region_width[i] and packed_region_height[i] specify the width and height of the packed region of the packed frame corresponding to the i-th region of the projected frame.

packed_region_top_left_x[i] and packed_region_top_left_y[i] specify horizontal and vertical coordinates of the top-left corner of the packed region of the packed frame corresponding to the i-th region of the projected frame.

Figure 15:
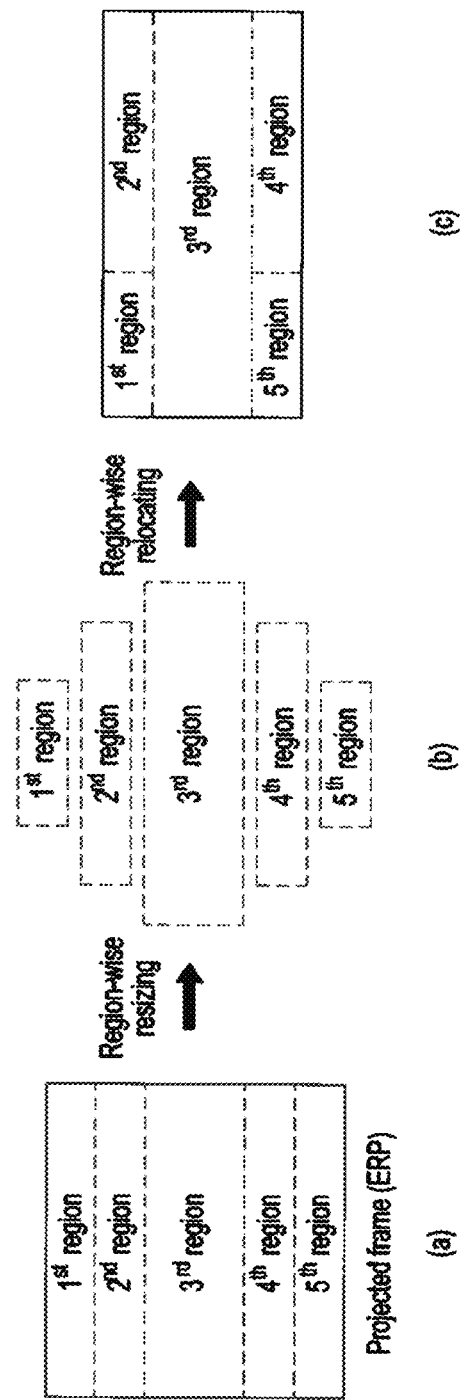
FIGS. 15A to 15C are exemplary diagrams illustrating a region-wise packing method for resizing and relocating a region according to latitude in equirectangular projection (ERP) according to the disclosure.

FIGS. 15A to 15C are exemplary diagrams illustrating a region-wise packing method for resizing and relocating a region according to latitude in equirectangular projection (ERF) according to the disclosure.

In OMAF, a region-wise packing method for improving coding efficiency is included by eliminating redundant regions. For example, ERF stitches each parallel of a sphere and transforms the spherical surface to a flat rectangular region. The range of stitching increases extremely in the polar direction.

Referring to FIGS. 15A to 15C, by reducing the area of the pole region, the coding efficiency of the projected frame can be improved.

For example, in ERP, a first region and a fifth region corresponding to high latitude regions (greater than 60 degrees or less than −60 degrees) are sampled at a 1:3 ratio, a second region and a fourth region corresponding to mid-latitude regions (greater than 30 degrees and 60 degrees or less, or less than −30 degrees and −60 degrees or greater) are sampled at a 2:3 ratio, and a third region corresponding to low latitude regions (30 degrees or less and −30 degrees or greater) is sampled at a 1:1 ratio. The sampled regions may be relocated as shown in FIG. 15C, thereby obtaining the packed frame.

Figure 16:
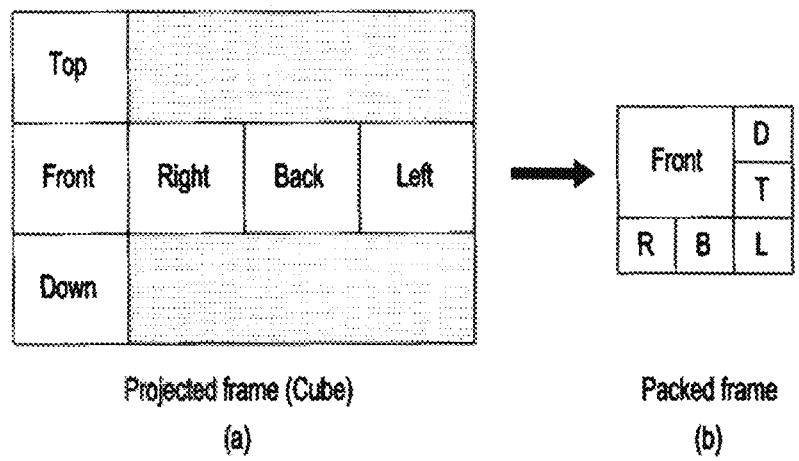
FIGS. 16A and 16B are exemplary diagrams illustrating region-wise packing for cube projection for viewport dependent streaming according to the disclosure.

FIGS. 16A and 16B are exemplary diagrams illustrating region-wise packing for cube projection for viewport dependent streaming according to the disclosure.

In viewport dependent streaming, to reduce the bit rate of the projected frame, only a current viewport region is encoded with high quality and the other regions are encoded with low quality. FIGS. 16A and 16B are exemplary diagrams illustrating region-wise packing for the cube map of a projected frame composed of a front face and down-sampled five faces of ⅕ (left face, right face, rear face, top face, and bottom face).

These cases can generally be transformed by mapping a rectangle to a rectangle. However, because the sampling rate changes significantly, rectangle-based mapping may cause discontinuity between subregions at the boundary. This discontinuity reduces coding efficiency and has visual defects. For this reason, in order to improve the coding efficiency of the projected frame, more flexible region-wise packing is required.

Trapezoid Based Region-Wise Packing

To improve the flexibility of region-wise packing, rectangle-to-trapezoid mapping is proposed. The rectangle-to-trapezoid mapping enables various and efficient region-wise packing methods. If the short side of a trapezoid is 1 pixel, the trapezoid becomes a triangle.

Figure 17:
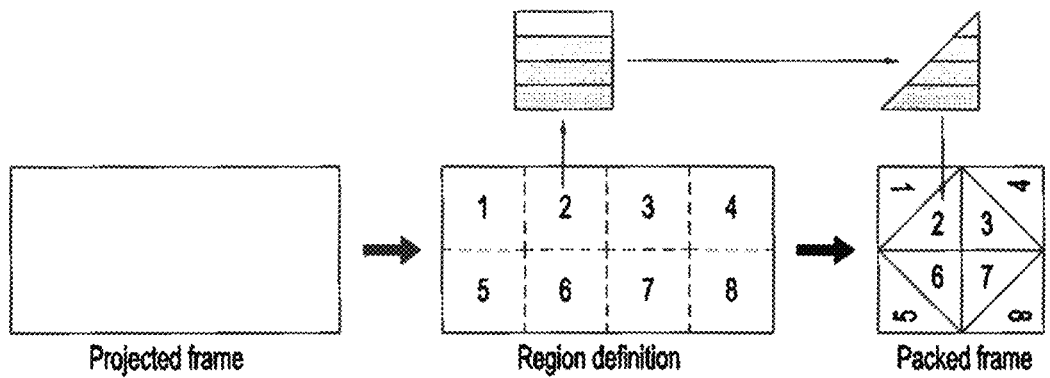
FIG. 17 is an exemplary diagram illustrating an embodiment of a method for packing an ERP image according to the disclosure.

FIG. 17 is an exemplary diagram illustrating an embodiment of a method for packing an ERP image according to the disclosure.

Rectangular ERP

As described above, ERP generates a pole region that increases extremely. As a result, redundant pixels in the pole region may unnecessarily reduce the coding efficiency of video.

FIG. 17 illustrates region-wise packing approach that reduces the sampling rate of the pole region of an equirectangular panorama. The projected frame is first divided into eight rectangular subregions, and each region is transformed to a triangular shape and relocated to form a rectangular format, using line-by-line down-sampling.

Referring to the middle figure of FIG. 17, in one embodiment of a method of packing an ERP image according to the disclosure, the number of pixels in the pole region is extremely reduced, whereas the number of pixels in a relatively equatorial region is maintained. Furthermore, the packed frame is represented by a rectangular layout without discontinuity between subregions, and blank pixels do not contain new information.

Figure 18:
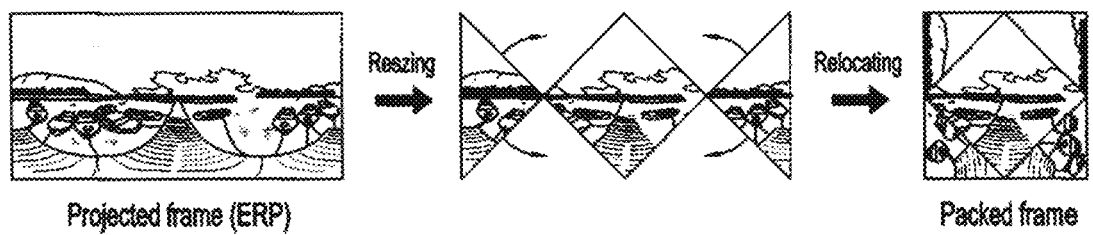
FIG. 18 is an exemplary diagram illustrating a method for packing an ERP image according to the disclosure.

FIG. 18 is an exemplary diagram illustrating a method for packing an ERP image according to the disclosure.

According to the method as shown in FIG. 17, when an ERP image is packed, the continuity is maintained at the boundaries of the respective regions, so that distortion at the boundaries can be alleviated at the time of de-packing. At the time of packing according to the method of FIG. 18, there is an advantage that the continuity of the images at the boundary of each region can be maintained.

Figure 19:
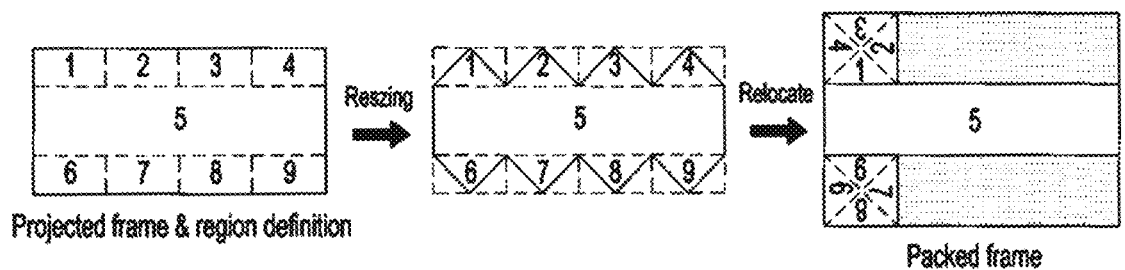
FIG. 19 is an exemplary diagram illustrating a method for transforming equirectangular projection to a cube-like layout according to the disclosure.

FIG. 19 is an exemplary diagram illustrating a method for transforming equirectangular projection to a cube-like layout according to the disclosure.

Cube-Like ERP

By using a method for mapping a rectangle to a triangle, the equirectangular projected frame can be transformed to a cube-like layout.

Referring to FIG. 19, the top region and the bottom region (i.e., pole regions) are divided into four subregions, and each subregion is transformed to a triangular region and relocated to the cube-like layout.

Figure 20:
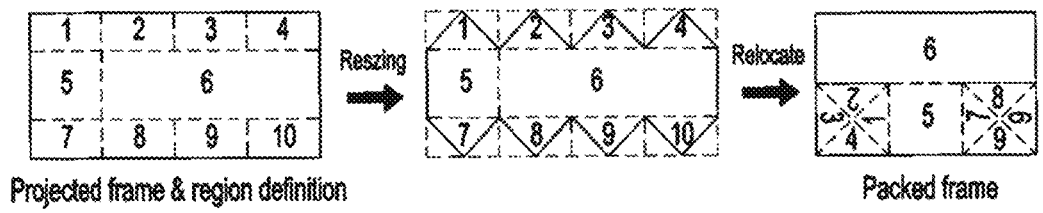
FIG. 20 is an exemplary diagram illustrating another embodiment for transforming equirectangular projection to a cube-like layout according to the disclosure.

FIG. 20 is an exemplary diagram illustrating another embodiment for transforming equirectangular projection to a cube-like layout according to the disclosure.

FIG. 19 is an example of a 4×3 cube map layout, and FIG. 20 is an example of 3×2 cube map layout.

Figure 21:
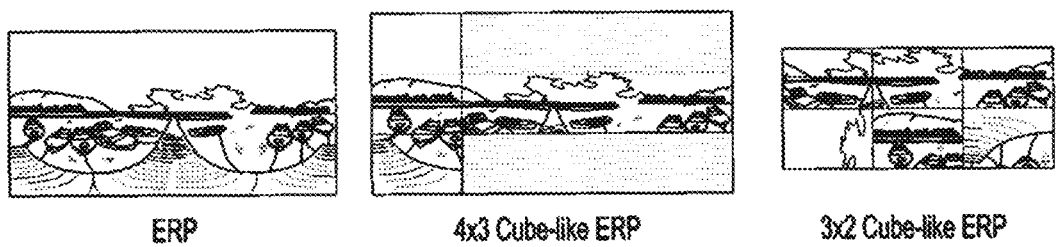
FIG. 21 is an exemplary diagram illustrating a method for transforming an ERP image into a cube-like ERP according to the disclosure.

FIG. 21 is an exemplary diagram illustrating a method for transforming an ERP image into a cube-like ERP according to the disclosure.

FIG. 21 shows an ERP image, a 4×3 cube map layout according to FIG. 20, and a 3×2 cube map layout according to FIG. 20.

2.3. Truncated Square Pyramid (TSP) Packing Method

Figure 22:
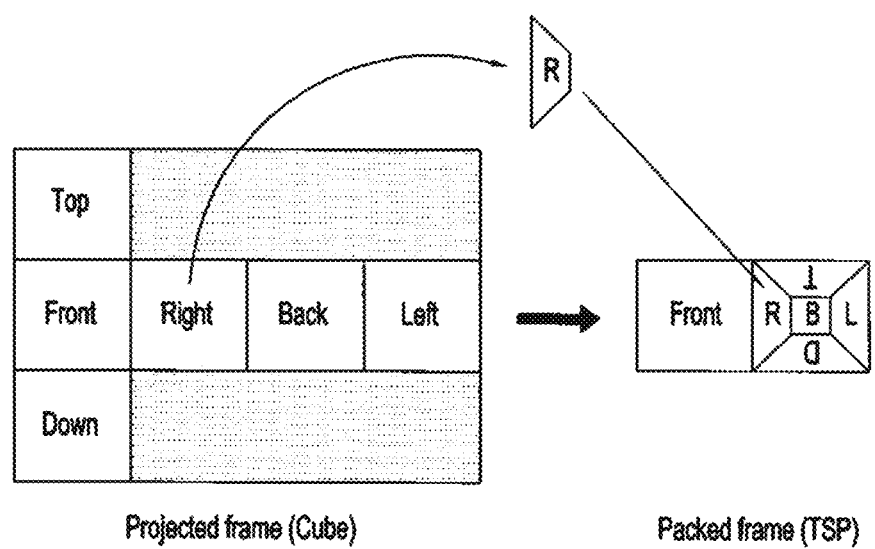
FIG. 22 is an exemplary diagram illustrating a truncated square pyramid (TSP) packing method according to the disclosure.

FIG. 22 is an exemplary diagram illustrating a TSP packing method according to the disclosure.

By the TSP packing method, a cube map frame can be transformed into a TSP.

Referring to FIG. 22, for example, a front may be a square sampled at a 1:1 ratio, a back may be a square sampled at a 1:9 ratio, and each of right, left, top, and bottom may be an isosceles trapezoid sampled at a 2:9 ratio.

According to the TSP packing method of FIG. 22, there is an effect of reducing distortion at the boundary.

Parameters proposed by the disclosure will be described.

Figure 23:
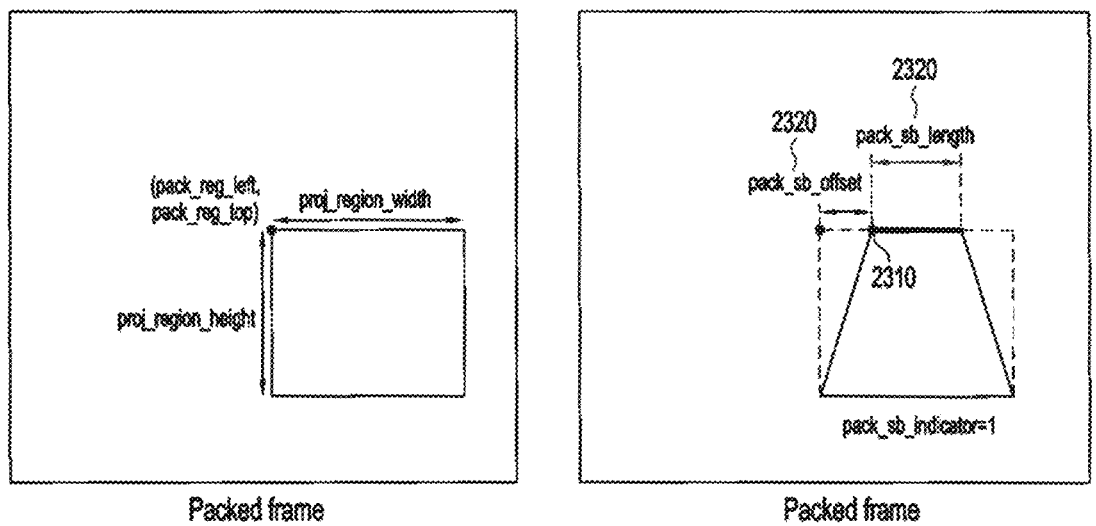
FIG. 23 is an exemplary diagram illustrating an embodiment of a TSP packing method according to the disclosure.

FIG. 23 is an exemplary diagram illustrating an embodiment of a TSP packing method according to the disclosure.

To support the proposed rectangle-to-trapezoid transformation mapping, the corresponding mapping is proposed to include four parameters. The rectangular region of the packed frame is defined by four parameters. The four parameters are the horizontal and vertical coordinates (pack_reg_left, pack_reg_top), width, and height (pack_reg_width, pack_reg_height) of the top-left vertex.

Then, inside the rectangular region, the side of the rectangle is set as a shorter side of the trapezoid represented by offset information (pack_sb_offset) 2320 indicating the position of a start point 2310 and a length (pack_sb_length) 2330 to define a trapezoidal region.

Figure 24:
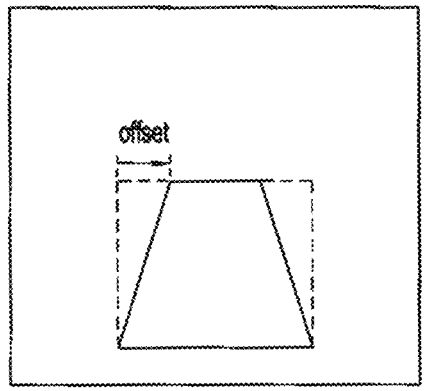
FIG. 24 is an exemplary diagram illustrating another embodiment of a TSP packing method according to the disclosure.
Figure 24:
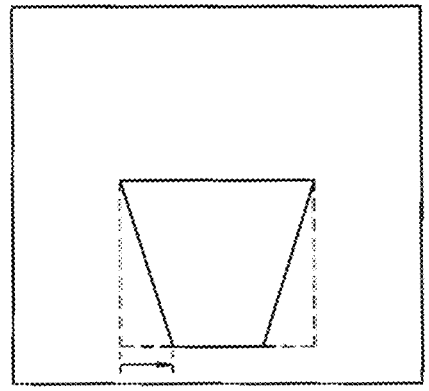
Figure 24:
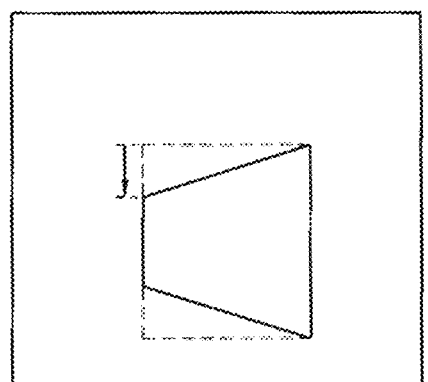
Figure 24:
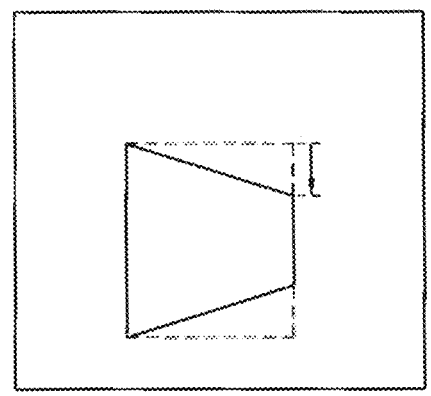

FIG. 24 is an exemplary diagram illustrating another embodiment of a TSP packing method according to the disclosure.

Referring to FIG. 24, to indicate which side is the short side, another parameter (pack_sb_indicator) is defined. For example, if pack_sb_indicator is 1, the top side can be shorter, and if pack_sb_indicator is 2, the bottom side can be shorter. If pack_sb_indicator is 3, the left side can be shorter, and if pack_sb_indicator is 4, the right side can be shorter.

Syntax

Table 7 shows syntax for carrying out the TSP packing method.

TABLE 7

```
aligned(8) class VRRegionWisePacking {
    unsigned int(32) width_proj_frame;
    unsigned int(32) height_proj_frame;
    unsigned int(8) number_of_regions;
    for (n = 0; n < number_of_regions; n++) {
        unsigned int(32) proj_reg_top[n];
        unsigned int(32) proj_reg _left[n];
        unsigned int(32) proj_reg_width[n];
        unsigned int(32) proj_reg_height[n];
        unsigned int(8) proj_reg_rotation[n];
        unsigned int(8) pack_sb_indicator[n];
        unsigned int(32) pack_reg_top[n];
        unsigned int(32) pack_reg_left[n];
        unsigned int(32) pack_reg_width[n];
        unsigned int(32) pack_reg_height[n];
        if (pack_sb_indicator[n]>0) {
            unsigned int(32) pack_sb_offset[n];
```

TABLE 7-continued

```
        unsigned int(32) pack_sb_length[n];
    }
  }
}
```

Semantics proj_frame_width specifies the width of the projected frame.

proj_frame_height specifies the height of the projected frame.

number_of_regions specifies the number of subregions of the projected frame.

proj_reg_top[n] and proj_reg_left[n] specify x and y coordinates of the top-left vertex of an n-th rectangular subregion of a projected frame, and proj_reg_width[n] and proj_reg_height[n] specify the width and height of the n-th rectangular subregion of the projected frame.

pack_reg_top[n] and pack_reg_left[n] specify x and y coordinates of the top-left vertex of an n-th rectangular subregion of a packed frame, and pack_reg_width[n] and pack_reg_height[n] specify the width and height of the n-th rectangular subregion of the packed frame.

pack_sb_offset[n] specifies a distance from the top-left vertex of the n-th rectangular subregion of the projected frame to the start point of the shorter side.

pack_sb_length[n] specifies a length of the shorter side of the n-th rectangular subregion of the projected frame.

pack_sb_indicators[n] specifies the position of a shorter side of an n-th trapezoidal subregion of the packed frame corresponding to the n-th rectangular subregion of the projected frame. If pack_sb_indicators[n] is greater than 0, the n-th rectangular subregion of the projected frame is a trapezoid, and if pack_sb_indicators [n] is zero, the n-th rectangular subregion of the projected frame is a rectangle. Table 8 shows the position of the shorter side according to pack_sb_indicators [n].

TABLE 8

| Value | pack_sb_indicators[n] |
|---|---|
| 0 | no shorter base (rectangular region) |
| 1 | top side |
| 2 | bottom side |
| 3 | left side |
| 4 | right side | proj_reg_rotation[n] specifies clockwise rotation of image data corresponding to the n-th subregion of the projected frame. Table 9 shows a rotation angle according to proj_reg_rotation [n].

TABLE 9

| Value | pack_sb_indicators[n] |
|---|---|
| 0 | no rotation |
| 1 | 90 degrees rotation |
| 2 | 180 degrees rotation |
| 3 | 270 degrees rotation |

In a VR 360 system using multiple fisheye cameras, circular images taken by the fisheye cameras are directly encoded and transmitted. At the receiving end, a decoded image/video is rendered directly according to a user's intended viewport. This method is useful for low delay live streaming or high quality 360-degree video transmission because images taken without an intermediate projection method, such as ERP or cube map projection, are rendered directly.

In the previous conference, the concept and indicators of monoscopic/stereoscopic, region-wise packing and fisheye camera, and lens parameters were agreed. Although the monoscopic/stereoscopic packing arrangement has been considered in pre-stitched packing of 360-degree videos, packing of a plurality of stereoscopic fisheye images has not yet been addressed. Unlike the pre-stitched packing of the 360-degree videos in which a rectangular or triangular region can be flexibly packed, a typical fisheye camera is mainly proposed in video data in the form of a circle.

Various Layouts of Stereoscopic Packing for Fisheye

Figure 25:
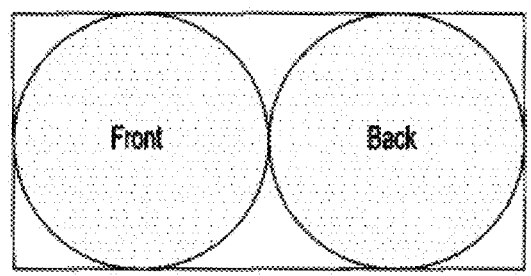
FIG. 25 is an exemplary diagram illustrating a typical fisheye video including two circular images according to the disclosure.

FIG. 25 is an exemplary diagram illustrating a typical fisheye video including two circular images according to the disclosure.

Figure 26A:
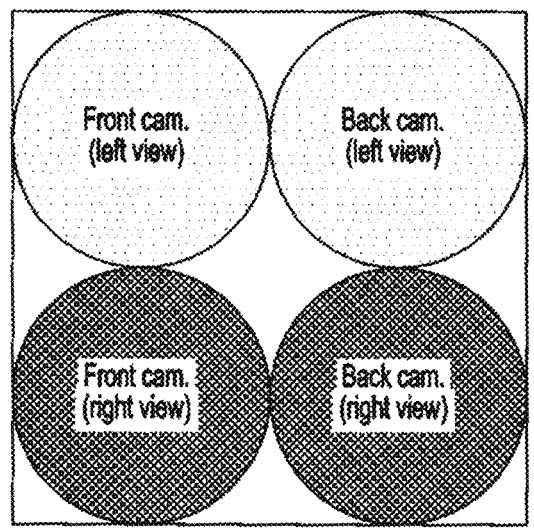
FIG. 26A is an exemplary diagram illustrating a stereoscopic fisheye video of top/bottom stereo format according to the disclosure.
Figure 26B:
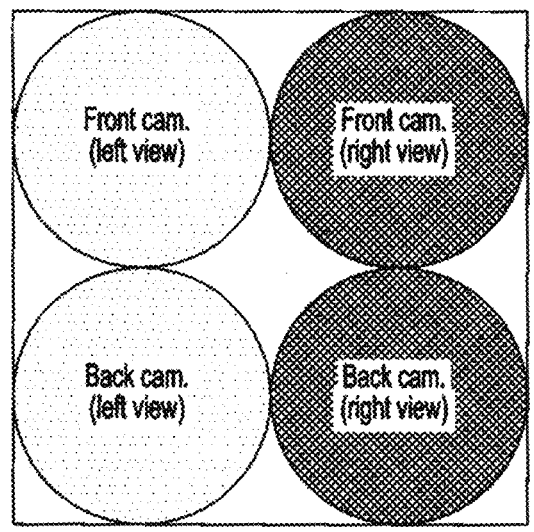
FIG. 26B is an exemplary diagram illustrating a stereoscopic fisheye video of a left and right stereo format according to the disclosure.

FIG. 26A is an exemplary diagram illustrating a stereoscopic fisheye video of a top/bottom stereo format according to the disclosure, and FIG. 26B is an exemplary diagram illustrating a stereoscopic fisheye video of a left and right stereo format according to the disclosure.

Figure 27:
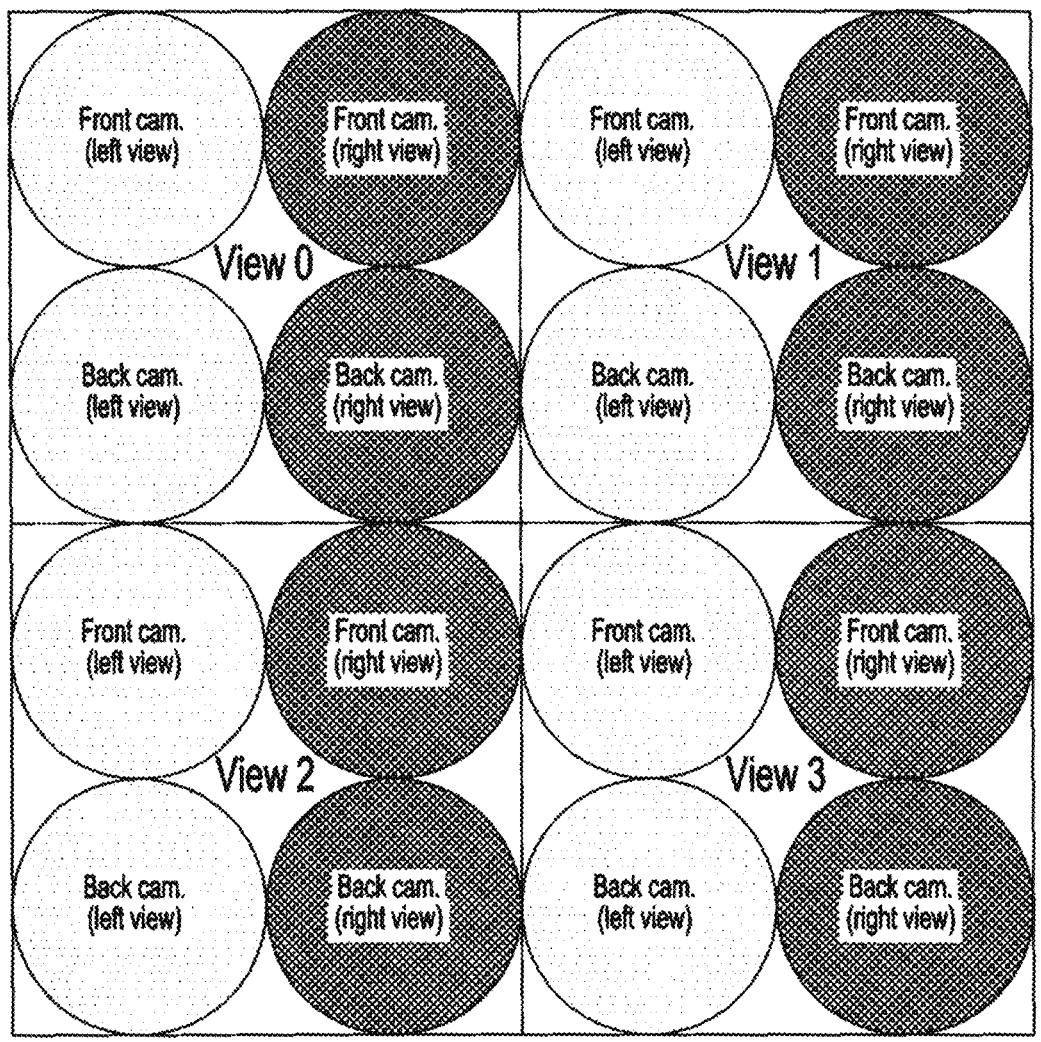
FIG. 27 is an exemplary diagram illustrating a stereoscopic fisheye video having a pair-wise format for multi-view according to the disclosure.

FIG. 27 is an exemplary diagram illustrating a stereoscopic fisheye video having a pair-wise format for multi-view according to the disclosure.

Figure 28:
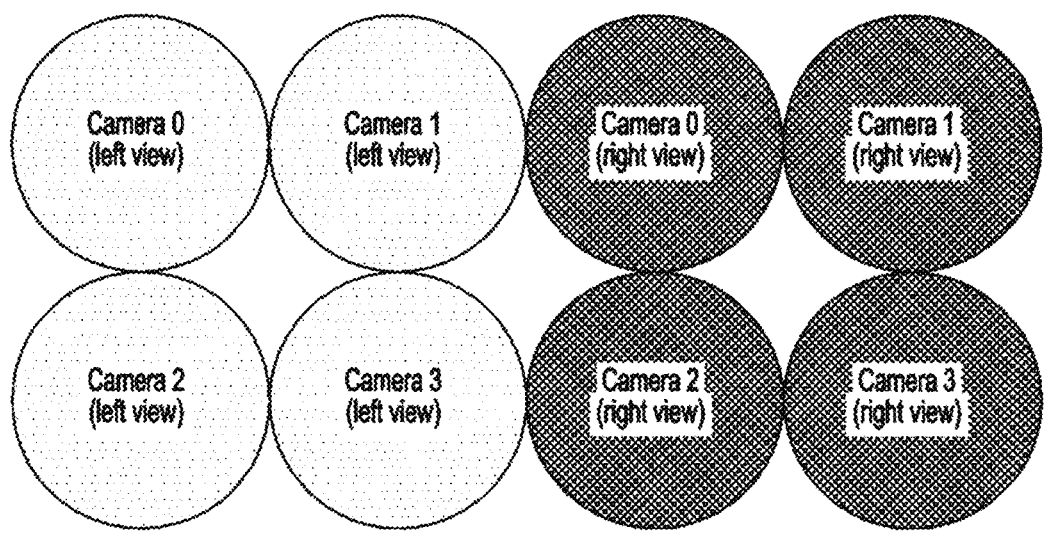
FIG. 28 is an exemplary diagram illustrating a stereoscopic fisheye video having a group-wise format for multi-view according to the disclosure.

FIG. 28 is an exemplary diagram illustrating a stereoscopic fisheye video having a group-wise format for multi-view according to the disclosure.

Omnidirectional Fisheye Video

Without a projection and region-wise packing processor, multiple circular images taken by fisheye cameras can be projected directly onto an image frame. The image frame may include an omnidirectional fisheye video. At the receiving end, a decoded omnidirectional fisheye video is stitched and rendered according to a user's intended viewport using signaled fisheye video parameters. The fisheye video parameters include at least one of lens distortion correction (LDC) parameters having a field of view (FOV), lens shading compensation parameters having red-green-blue (RGB) gains, a displayed field of view information, and camera extrinsic parameters.

Syntax

Table 10 shows syntax for a stereoscopic fisheye video for multi-view.

TABLE 10

```
aligned(8) class fisheye_video_info( )
{
    bit(24) reserved = 0;
    unsigned int(8) num_circular_images;
    for(i=0; i< num_circular_images; i++) {
        unsigned int(32) image_center_x;
        unsigned int(32) image_center_y;
        unsigned int(32) full_radius;
        unsigned int(32) frame_radius;
        unsigned int(32) scene_radius;
        unsigned int(32) image_rotation;
        bit(30) reserved = 0;
        unsigned int(2) image_flip;
        unsigned int(32) image_scale_axis_angle;
        unsigned int(32) image_scale_x;
        unsigned int(32) image_scale_y;
        unsigned int(32) field_of_view;
        bit(16) reserved = 0;
        unsigned int (16) num_angle_for_displaying_fov;
        for(j=0; j< num_angle_for_displaying_fov; j++) {
            unsigned int(32) displayed_fov;
            unsigned int(32) overlapped_fov;
        }
        unsigned int(32) camera_center_yaw;
```

TABLE 10-continued

```
        unsigned int(32) camera_center_pitch;
        unsigned int(32) camera_center_roll;
        unsigned int(32) camera_center_offset_x;
        unsigned int(32) camera_center_offset_y;
        unsigned int(32) camera_center_offset_z;
        bit(16) reserved = 0;
        unsigned int(16) num_polynomial_coefficeients;
        for(j=0; j< num_polynomial_coefficients; j++) {
            unsigned int(32)
polynomial_coefficient_K;
        }
        bit(16) reserved = 0;
            unsigned int (16) num_local_fov_region;
            for(j=0; j<num_local_fov_region; j++) {
                unsigned int(32) start_radius;
                unsigned int(32) end_radius;
                unsigned int(32) start_angle;
                unsigned int(32) end_angle;
                unsigned int(32) radius_delta;
                unsigned int(32) angle_delta;
                for(rad=start_radius; rad<= end_radius;
rad+=radius_delta) {
                    for(ang=start_angle; ang<=
ang_radius; ang+=angle_delta) {
                        unsigned int(32)
local_fov_weight;
                    }
                }
            }
        bit(16) reserved = 0;
        unsigned int(16) num_polynomial_coefficients_lsc;
        for(j=0; j< num_polynomial_coefficients_lsc; j++) {
            unsigned int (32)
polynomial_coefficient_K_lsc_R;
            unsigned int (32)
polynomial_coefficient_K_lsc_G;
            unsigned int (32)
polynomial_coefficient_K_lsc_B;
        }
    }
    bit(24) reserved = 0;
    unsigned int(8) num_deadzones;
    for(i=0; i< num_deadzones; i++) {
        unsigned int(16) deadzone_left_horizontal_offset;
        unsigned int(16) deadzone_top_vertical_offset;
        unsigned int(16) deadzone_width;
        unsigned int(16) deadzone_height;
    }
}
```

Figure 29:
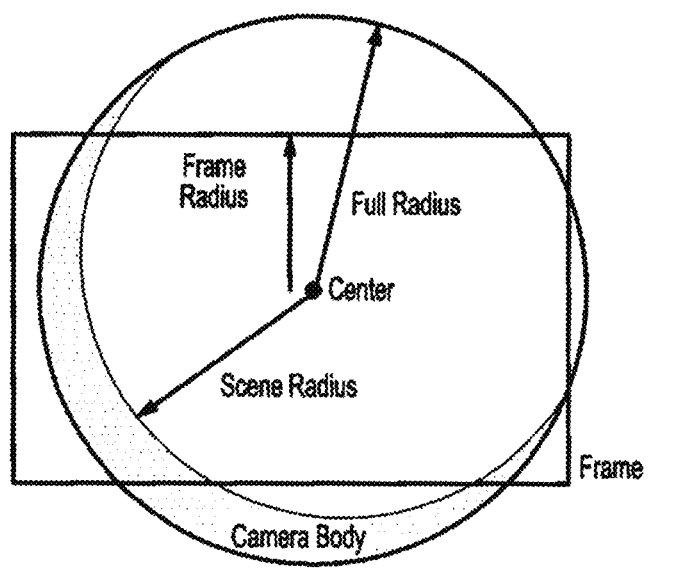
FIG. 29 is an exemplary diagram illustrating a fisheye camera according to the disclosure.
Figure 29:
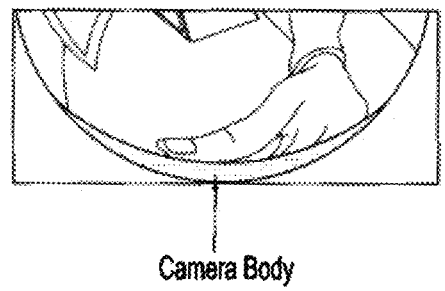

FIG. 29 is an exemplary diagram illustrating a fisheye camera according to the disclosure. The semantics of each term is as follows.

Semantics num_circular_images specifies the number of circular images in a coded picture of each sample. num_circular_images may be 2 or may be an integer other than 0.

image_center_x is the value of a fixed point 16,16 indicating horizontal coordinates of the center of the circular image in a coded picture of each sample to which this syntax is applied in luma samples.

image_center_y is the value of a fixed point 16,16 indicating vertical coordinates of the center of the circular image in a coded picture of each sample to which this syntax is applied in luma samples.

full_radius is the value of a fixed point 16,16 indicating a radius from the center of the circular image to the edge of a full round image in luma samples.

frame_radius is the value of a fixed point 16,16 indicating a radius from the center of the circular image to the edge of the nearest image boundary in luma samples. A circular fisheye image can be truncated by a camera frame, and frame_radius is a radius of a circle indicating unusable pixels.

scene_radius is the value of a fixed point 16,16 indicating a radius from the center of the circular image to the edge of the region of the nearest image in luma samples. The image region is a region which is guaranteed to be free of obstacles from the camera body and which is free from excessively large lens distortion when stitching.

Figure 30:
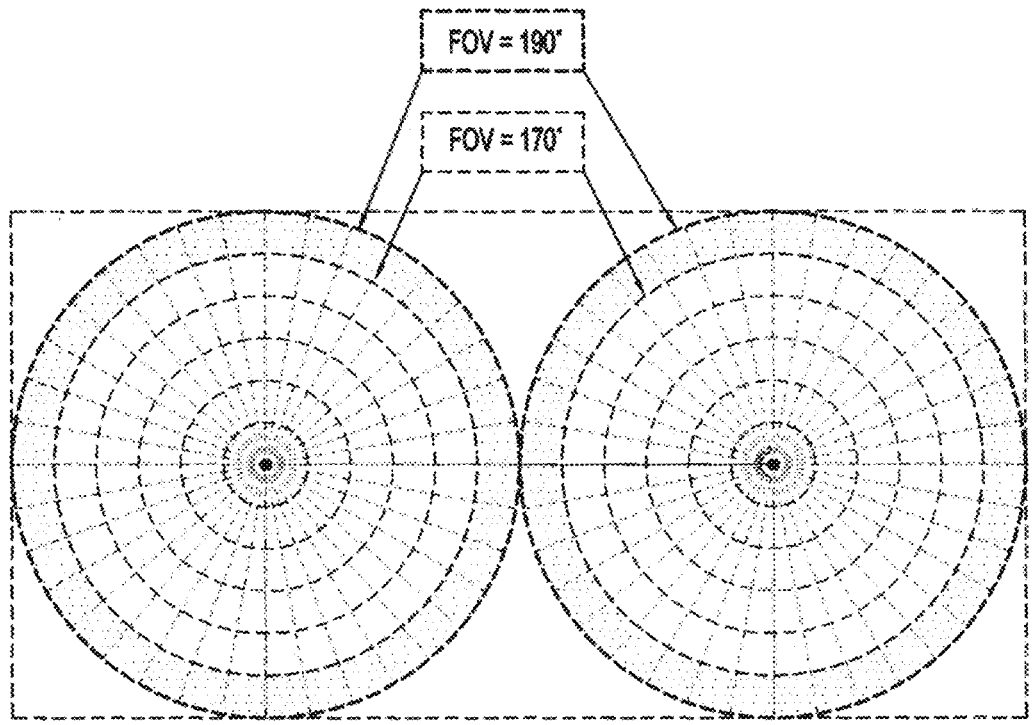
FIG. 30 illustrates a displayed field of view (FOV) for two fisheye images in a fisheye camera according to the disclosure.

FIG. 30 illustrates a displayed FOV for two fisheye images in a fisheye camera according to the disclosure.

image_rotation is the value of a fixed point 16.16 indicating the amount of rotation of a circular image in angular units. Other video camera manufacturers use different coordinate systems or different layouts for each photographed individual fisheye image. Images range from −90 degrees to +90 degrees, or from −180 degrees to +180 degrees.

image_flip indicates whether the image is flipped or how much the image is flipped. Thus, an inverse flip operation needs to be applied. If image_flip is 0, the image is not flipped. If image_flip is 1, the image is flipped vertically. If image_flip is 2, the image is flipped horizontally. If image_flip is 3, the image is flipped horizontally and flipped vertically.

image_scale_axis_angle, image_scale_x, and image_scale_y are the values of a fixed point 16.16 indicating along which axis the image is scaled or how much the image is scaled. By indicating the value of image_scale_axis_angle in angular units, the axis is defined by a single angle. An angle of 0 degrees (image_scale_axis_angle) means that the horizontal vector is completely horizontal and the vertical vector is completely vertical. The values of image_scale_x and image_scale_y respectively indicate scaling ratios of directions parallel and perpendicular to the axis.

field_of_view is the value of a fixed point 16.16 indicating the FOV of the fisheye lens in angular unit. A typical value (field of view) of a hemispherical fisheye lens is 180 degrees.

num_angle_for_displaying_fov indicates the number of angles. If num_angle_for_displaying_fov is 12, the fisheye image is divided into 12 sectors. The angle of each sector is 30 degrees. The values of a displayed FOV and an overlapped FOV are defined clockwise.

displayed_fov indicates a rendered and displayed FOV and a corresponding image region of each fisheye camera image.

overlapped_fov indicates overlapped regions in terms of FOV between multiple circular images.

The parameters represent a relationship between the fisheye images. On the other hand, scene_radius represents a relationship between the fisheye lens and the camera body.

If the value of num_circular_images is 2, the basic value of displayed_fov is 180 degrees.

However, the above values may vary depending on the characteristics of the lens and content.

Figure 31:
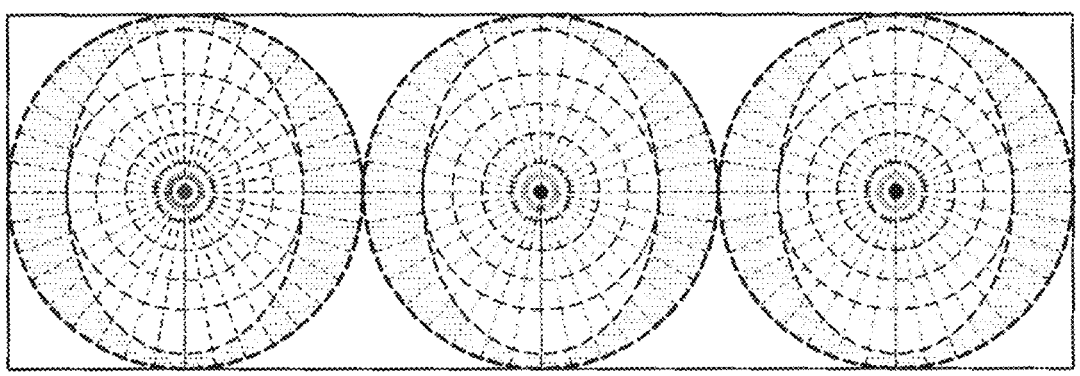
FIG. 31 illustrates a displayed FOV and an overlapped FOV for multiple fisheye images in a fisheye camera according to the disclosure.

Referring to FIG. 31, for example, in the stitching quality with displayed_fov values, if the left camera is 170 degrees and the right camera is 190 degrees which has better quality than the basic value (180 degrees), updated displayed_fov values may be obtained.

FIG. 31 illustrates a displayed FOV and an overlapped FOV for multiple fisheye images in a fisheye camera according to the disclosure.

However, in the case of multiple fisheye images, a single displayed_fov value cannot describe the exact region of each fisheye image.

Referring to FIG. 31, displayed_fov (dark part) varies according to direction. To describe displayed_fov according to direction, num_angle_for_displaying_fov is introduced, and displayed_fov and overlapped_fov are defined in the clockwise direction.

Figure 32:
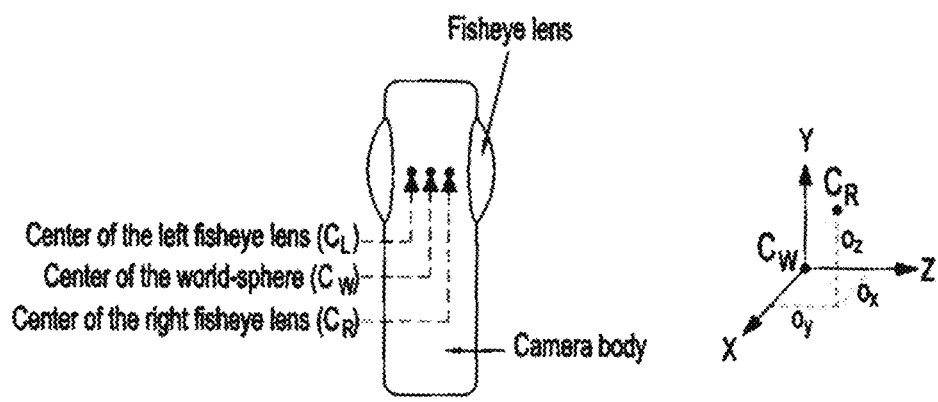
FIG. 32 is an exemplary diagram illustrating the center of a fisheye camera according to the disclosure.

FIG. 32 is an exemplary diagram illustrating the center of a fisheye camera according to the disclosure.

num_polynomial_coefficients is an integer specifying the number of coefficients present in a polynomial. A list of the coefficients of the polynomial polynomial_coefficient_K is the value of a fixed point 16.16 indicating coefficients of a polynomial that describe transformation of a fisheye space into a non-distorted planar image. A description of the polynomial can be found in "omnidirectional camera calibration" written by Scaramuzza et al.

num_local_fov_region indicates the number of local fitting regions having another FOV.

start_radius, end_radius, start_angle, and end_angle indicate regions for local fitting/warping that changes an actual FOV to be displayed locally.

radius_delta indicates a delta value to represent another FOV for each radius.

angle_delta indicates a delta value to represent another FOV for each angle.

local_fov_weight indicates a weight value for the FOV of a position specified by start_radius, end_radius, start_angle, end_angle, the angle index i, and the radius index j.

Figure 33:
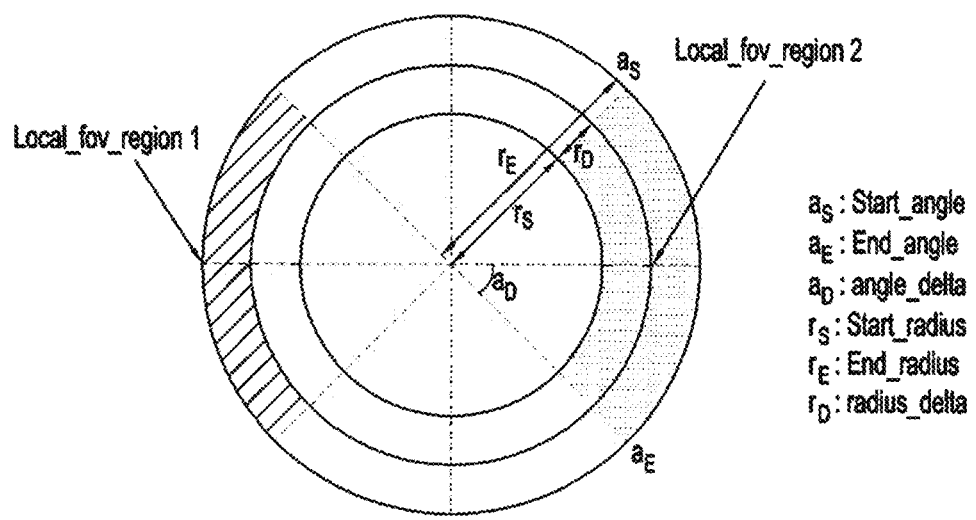
FIG. 33 is an exemplary diagram illustrating parameters for a local FOV according to the disclosure.

FIG. 33 is an exemplary diagram illustrating parameters for a local FOV according to the disclosure.

Figure 34:
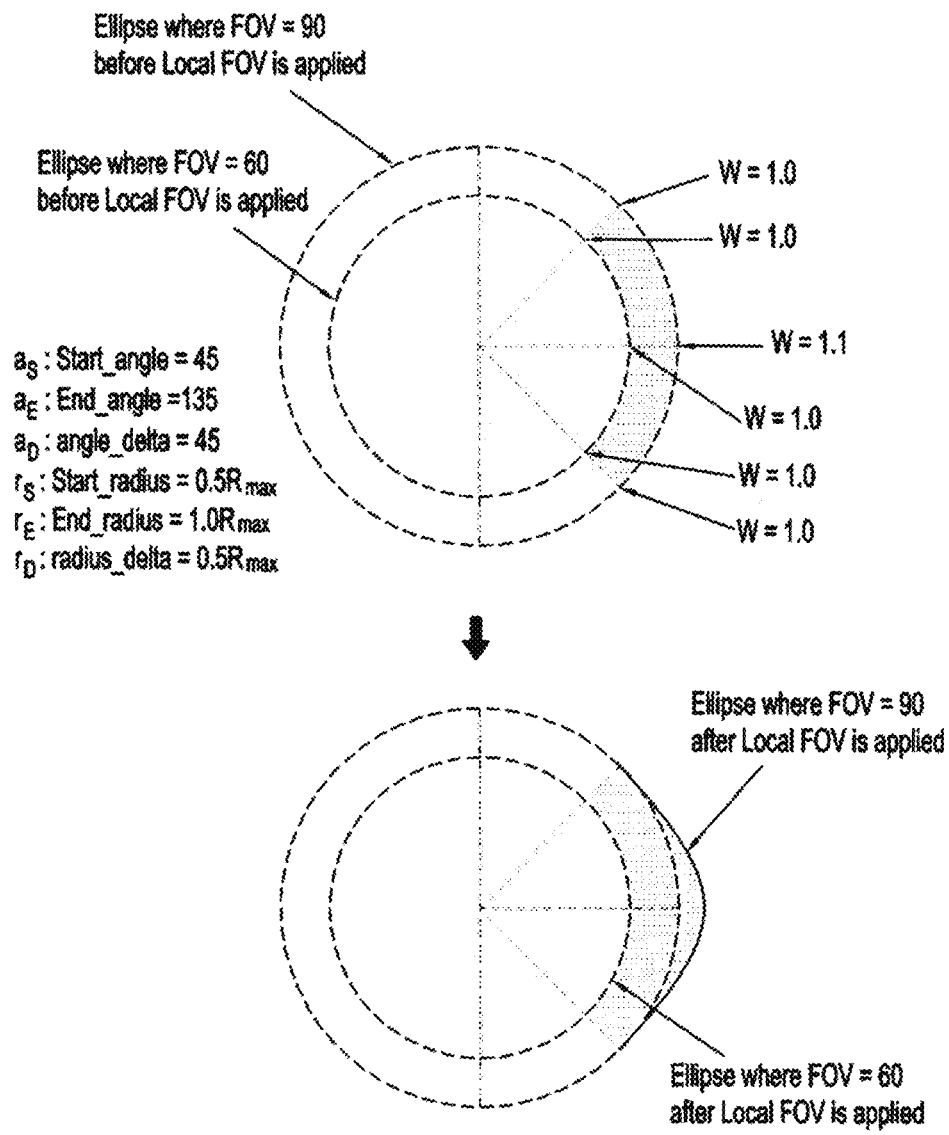
FIG. 34 is an exemplary diagram illustrating a local FOV according to a partial embodiment of the disclosure.

FIG. 34 is an exemplary diagram illustrating a local FOV according to a partial embodiment of the disclosure.

num_polynomial_coefficeients_lsc may be an order of polynomial approximation of a lens shading curve.

polynomial_coefficient_K_lsc_R may be a polynomial coefficient approximate to the lens shading curve for a red color component in a fixed point 16.16 format.

polynomial_coefficient_K_lsc_G may be a polynomial coefficient approximate to the lens shading curve for a green color component in a fixed point 16.16 format.

polynomial_coefficient_K_lsc_B may be a polynomial coefficient approximate to the lens shading curve for a blue color component in a fixed point 16.16 format.

num_deadzones is an integer indicating the number of dead zones in a coded picture of each sample applied by this syntax.

deadzone_left_horizontal_offset, deadzone_top_vertical_offset, deadzone_width, and deadzone_height are integer values indicating the position and size of a dead zone rectangular region. Pixels cannot be used in the dead zone.

deadzone_left_horizontal_offset and deadzone_top_vertical_offset respectively indicate the horizontal and vertical coordinates of the top-left corner of the dead zone in the encoded picture in luma samples.

deadzone_width and deadzone_height indicate the width and height of the dead zone, respectively, in luma samples. To conserve bits for representing a video, all pixels in the dead zone are set to the same pixel value (e.g., all black).

A method for transmitting stereoscopic video content may include generating, on the basis of data of a stereoscopic video which includes a plurality of omnidirectional videos having parallax, a first frame including a plurality of first views projected from the plurality of omnidirectional videos; generating a second frame including a plurality of second views by packing, on the basis of region-wise packing information, a plurality of first regions included in the plurality of first views; and transmitting data on the generated second frame, wherein the plurality of second views include a plurality of second regions corresponding to the plurality of first regions, and the region-wise packing information includes information on shape, orientation, or transformation for each of the plurality of second regions.

The region-wise packing information may further include information indicating whether the stereoscopic video has a left/right stereoscopic 360 format or a top/bottom stereoscopic 360 format.

In addition, the region-wise packing information may further include a stereoscopic packing type indicating one of non-region-wise packing, separate and independent packing, separate and mirroring packing, mixed and independent packing, and mixed and pair-wise packing.

The information on the shape of each of the plurality of second regions may indicate one of a plurality of shapes as the shape of each of the plurality of second regions, and the plurality of shapes may include a trapezoid.

In addition, the method for transmitting stereoscopic video content according to the disclosure may further include generating one omnidirectional video among the plurality of omnidirectional videos on the basis of an image obtained by a plurality of fisheye lenses, wherein information on the one omnidirectional video may include information indicating the number of divided regions obtained by dividing the image obtained by each of the plurality of fisheye lenses according to a specific angle with respect to the center; information indicating a region corresponding to a field of view (FOV) in each of the divided regions; and information indicating a region overlapped with an image obtained by another fisheye lens in each of the divided regions.

In addition, each of the plurality of first views may be a spherical projection image, an equirectangular projection image (ERP image), or a regular polyhedron projection image, and the regular polyhedron projection image may be a tetrahedron projection image, a cube projection image, a regular octahedron projection image, a regular dodecahedron projection image, or a regular icosahedron projection image.

The region-wise packing information may further include position information and size information of the plurality of first regions and position information and size information of the plurality of second regions.

In addition, when the stereoscopic packing type indicates the non-region-wise packing, the position information and size information of each of the plurality of first regions may be identical to the position information and size information of the corresponding second region among the plurality of second regions.

In addition, when the stereoscopic packing type indicates the separate and independent packing, the plurality of second views may be separated and packed independently.

In addition, when the stereoscopic packing type indicates the separate and mirroring packing, the plurality of second views may be separated and packed in an identical manner.

In addition, when the stereoscopic packing type indicates the mixed and independent packing, the plurality of second views may be mixed with each other and packed independently.

When the stereoscopic packing type indicates the mixed and pair-wise packing, the plurality of second views may be mixed with each other, paired, and packed.

In addition, the plurality of first views may be cube projected images including front, rear, left, right, top, and bottom faces, the plurality of second regions may correspond to the front, rear, left, right, top, and bottom faces, respectively, each of the regions corresponding to the left, right, top, and bottom faces among the plurality of second regions may have a trapezoidal shape, and the size of the region corresponding to the front face among the plurality of second regions may be larger than the size of the region corresponding to the rear face.

Although the disclosure has been described in detail with reference to the accompanying drawings, it is to be understood that the disclosure is not limited to the above-described embodiments. Those skilled in the art will appreciate that various modifications and changes, of course, are possible. Accordingly, the scope of protection of the disclosure should not be limited to the above-described embodiments, but should be determined by the description of the following claims.

The invention claimed is:

1. A method for transmitting stereoscopic video content, comprising:
generating, based on data of a stereoscopic video which includes a plurality of omnidirectional videos having parallax, a first frame corresponding to a first view and a second frame corresponding to a second view, wherein the first frame comprises a plurality of first regions, the second frame comprises a plurality of second regions, and the first frame and the second frame are projected from the plurality of omnidirectional videos;
generating a third frame comprising a plurality of third regions by packing, based on region-wise packing information, wherein the plurality of third regions correspond to the plurality of first regions and the plurality of second regions; and
transmitting data on the generated third frame,
wherein the region-wise packing information includes information on shape, orientation, or transformation for each of the plurality of third regions.

2. The method of claim 1, wherein the region-wise packing information further includes information indicating whether the stereoscopic video has a left/right stereoscopic 360 format or a top/bottom stereoscopic 360 format.

3. The method of claim 1, wherein the region-wise packing information further includes a stereoscopic packing type indicating one of non-region-wise packing, separate and independent packing, separate and mirroring packing, mixed and independent packing, and mixed and pair-wise packing.

4. The method of claim 1, wherein the information on the shape of the each of the plurality of third regions indicates one of a plurality of shapes as the shape of the each of the plurality of third regions, and the plurality of shapes include a trapezoid.

5. The method of claim 1, further comprising:
generating one omnidirectional video among the plurality of omnidirectional videos based on an image obtained by a plurality of fisheye lenses,
wherein information on the one omnidirectional video includes
information indicating a number of divided regions obtained by dividing the image obtained by each of the plurality of fisheye lenses according to a specific angle with respect to the center;
information indicating a region corresponding to a field of view (FOV) in each of the divided regions; and
information indicating a region overlapped with an image obtained by another fisheye lens in the each of the divided regions.

6. The method of claim 1, wherein each of the first frame and the second frame is a spherical projection image, an equirectangular projection image (ERP image), or a regular polyhedron projection image, and the regular polyhedron projection image is a tetrahedron projection image, a cube projection image, a regular octahedron projection image, a regular dodecahedron projection image, or a regular icosahedron projection image.

7. The method of claim 1, wherein the region-wise packing information further includes
position information and size information of the plurality of first regions and the plurality of second regions, and
position information and size information of the plurality of third regions.

8. The method of claim 3, wherein,
when the stereoscopic packing type indicates the non-region-wise packing, the position information and size information of each of the plurality of first regions and the plurality of second regions are identical to the position information and size information of the corresponding second region among the plurality of third regions,
when the stereoscopic packing type indicates the separate and independent packing, a plurality of third views which correspond to the third frame are separated and packed independently,
when the stereoscopic packing type indicates the separate and mirroring packing, the plurality of third views are separated and packed in an identical manner,
when the stereoscopic packing type indicates the mixed and independent packing, the plurality of third views are mixed with each other and packed independently, and
when the stereoscopic packing type indicates the mixed and pair-wise packing, the plurality of third views are mixed with each other, paired, and packed.

9. The method of claim 1, wherein
each of the plurality of omnidirectional videos has a shape of a cube,
each of the plurality of first regions corresponds to front, rear, left, right, top and bottom faces of the cube,
each of the plurality of second regions corresponds to front, rear, left, right, top and bottom faces of the cube,
the plurality of third regions correspond to the front, rear, left, right, top, and bottom faces, respectively,
each region corresponding to the left, right, top, and bottom faces among the plurality of third regions has a trapezoidal shape, and
a size of a region corresponding to the front face among the plurality of third regions is larger than the size of the region corresponding to the rear face.

10. An apparatus for transmitting stereoscopic video content, comprising:
a memory;
a transceiver; and
at least one processor configured to be connected to the memory and the transceiver, wherein
the at least one processor is configured to generate, based on data of a stereoscopic video which includes a plurality of omnidirectional videos having parallax, a first frame corresponding to a first view and a second frame corresponding to a second view, wherein the first frame comprises a plurality of first regions, the second frame comprises a plurality of second regions, and the first frame and the second frame are projected from the plurality of omnidirectional videos,
generate a third frame comprising a plurality of third regions by packing, based on region-wise packing information, wherein the plurality of third regions correspond to the plurality of first regions and the plurality of second regions, and transmit data on the generated third frame, wherein the region-wise packing information includes information on shape, orientation, or transformation for each of the plurality of third regions.

11. The apparatus of claim 10, wherein the region-wise packing information further includes information indicating whether the stereoscopic video has a left/right stereoscopic 360 format or a top/bottom stereoscopic 360 format.

12. The apparatus of claim 10, wherein the region-wise packing information further includes a stereoscopic packing type indicating one of non-region-wise packing, separate and independent packing, separate and mirroring packing, mixed and independent packing, and mixed and pair-wise packing.

13. The apparatus of claim 10, wherein the information on the shape of each of the plurality of third regions indicates one of a plurality of shapes as the shape of the each of the plurality of third regions, and the plurality of shapes include a trapezoid.

14. The apparatus of claim 10, wherein the at least one processor is configured to generate one omnidirectional video among the plurality of omnidirectional videos based on an image obtained by a plurality of fisheye lenses, and information on the one omnidirectional video includes:

information indicating a number of divided regions obtained by dividing the image obtained by each of the plurality of fisheye lenses according to a specific angle with respect to the center;

information indicating a region corresponding to a field of view (FOV) in each of the divided regions; and information indicating a region overlapped with an image obtained by another fisheye lens in the each of the divided regions.

15. The apparatus of claim 10, wherein each of the first frame and the second frame is a spherical projection image, an equirectangular projection image (ERP image), or a regular polyhedron projection image, and the regular polyhedron projection image is a tetrahedron projection image, a cube projection image, a regular octahedron projection image, a regular dodecahedron projection image, or a regular icosahedron projection image.

* * * * *